(12) United States Patent
Kurase et al.

(10) Patent No.: US 11,995,804 B2
(45) Date of Patent: May 28, 2024

(54) PRINTER-EQUIPPED CAMERA AND DISPLAYING CONTROL METHOD THEREOF

(71) Applicant: FUJIFILM Corporation, Tokyo (JP)

(72) Inventors: Hiroyuki Kurase, Tokyo (JP); Tsuneo Sato, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/189,665

(22) Filed: Mar. 2, 2021

(65) Prior Publication Data

US 2021/0181605 A1    Jun. 17, 2021

Related U.S. Application Data

(63) Continuation of application No. PCT/JP2019/035583, filed on Sep. 10, 2019.

(30) Foreign Application Priority Data

Sep. 13, 2018    (JP) ................... 2018-171716

(51) Int. Cl.
    *G06T 5/75*         (2024.01)
    *G03B 17/53*       (2021.01)
    (Continued)

(52) U.S. Cl.
    CPC ............... *G06T 5/75* (2024.01); *G03B 17/53* (2013.01); *G06F 3/1423* (2013.01);
    (Continued)

(58) Field of Classification Search
None
See application file for complete search history.

(56) References Cited

U.S. PATENT DOCUMENTS 6,812,966 B1    11/2004    Nakazawa
6,963,359 B1    11/2005    Aosaki et al.
(Continued)

FOREIGN PATENT DOCUMENTS

CN        108234812 A      6/2018
JP         H11-301027 A     11/1999
(Continued)

OTHER PUBLICATIONS

An Office Action mailed by China National Intellectual Property Administration dated Sep. 13, 2021, which corresponds to Chinese Patent Application No. 201980059935.8 and is related to U.S. Appl. No. 17/189,665; with English language translation.
(Continued)

*Primary Examiner* — Quan Pham
(74) *Attorney, Agent, or Firm* — Studebaker & Brackett PC

(57) ABSTRACT

A printer-equipped camera includes an instant film pack loading unit in which an instant film pack, a first displaying unit of which a displaying surface is arranged to face an exposure surface of an instant film in the instant film pack through the exposure opening with respect to the instant film pack loaded in the instant film pack loading unit, and that exposes the instant film by displaying an image, a light exit direction restriction member that is included on the displaying surface of the first displaying unit and restricts a light exit direction of light from each pixel of the first displaying unit to a constant range, an imaging unit that captures a subject image, a second displaying unit that displays an image to an outside, a print instruction unit that provides a print instruction for the image displayed on the second displaying unit, and a displaying control unit that exposes the exposure surface of the instant film by displaying the image on the first displaying unit.

14 Claims, 27 Drawing Sheets

(51) Int. Cl.
*G06F 3/14* (2006.01)
*H04N 1/00* (2006.01)
*H04N 5/262* (2006.01)
*H04N 23/63* (2023.01)
*H04N 23/667* (2023.01)

(52) U.S. Cl.
CPC ..... *H04N 1/00161* (2013.01); *H04N 1/00167* (2013.01); *H04N 1/00172* (2013.01); *H04N 1/00188* (2013.01); *H04N 1/00251* (2013.01); *H04N 1/00408* (2013.01); *H04N 5/2628* (2013.01); *H04N 23/632* (2023.01); *H04N 23/667* (2023.01)

(56) References Cited

U.S. PATENT DOCUMENTS

| | | | |
|---|---|---|---|
| 6,999,113 | B1 | 2/2006 | Omura |
| 2002/0001472 | A1 | 1/2002 | Ohmura et al. |
| 2002/0034336 | A1* | 3/2002 | Shiota ............... H04N 1/4092 382/254 |
| 2004/0036923 | A1* | 2/2004 | Kokemohr ............ G06T 5/004 382/269 |
| 2004/0041920 | A1* | 3/2004 | Mizukami ............ H04N 1/603 348/222.1 |
| 2005/0179731 | A1* | 8/2005 | Omura ................. H04N 1/2112 347/50 |
| 2005/0263026 | A1* | 12/2005 | Aosaki ................. H04N 1/2112 101/492 |
| 2006/0139455 | A1* | 6/2006 | Suzuki ............... H04N 5/23293 348/333.12 |
| 2009/0165943 | A1* | 7/2009 | Kim .................. G02F 1/133524 156/276 |
| 2009/0180051 | A1* | 7/2009 | Lee .................... G02F 1/133308 349/58 |
| 2015/0138526 | A1* | 5/2015 | Degani .................... G02B 5/00 359/641 |
| 2018/0176433 | A1 | 6/2018 | Nishiura et al. |
| 2019/0096037 | A1 | 3/2019 | Fukazawa et al. |

FOREIGN PATENT DOCUMENTS

| | | |
|---|---|---|
| JP | 2000-196980 A | 7/2000 |
| JP | 2000-284370 A | 10/2000 |
| JP | 2001-45342 A | 2/2001 |
| JP | 2001-092016 A | 4/2001 |
| JP | 2001-277591 A | 10/2001 |
| JP | 4250032 B2 * | 4/2009 |
| WO | 2014/141612 A1 | 9/2014 |
| WO | 2017/122541 A1 | 7/2017 |

OTHER PUBLICATIONS

International Search Report issued in PCT/JP2019/035583; dated Dec. 17, 2019.
International Preliminary Report on Patentability and Written Opinion issued in PCT/JP2019/035583; dated Mar. 9, 2021.
An Office Action; "Notice of Reasons for Refusal", mailed by the Japanese Patent Office dated Apr. 15, 2022, which corresponds to Japanese Patent Application No. 2020-546041 and is related to U.S. Appl. No. 17/189,665; with English language translation.

* cited by examiner

FIG. 10
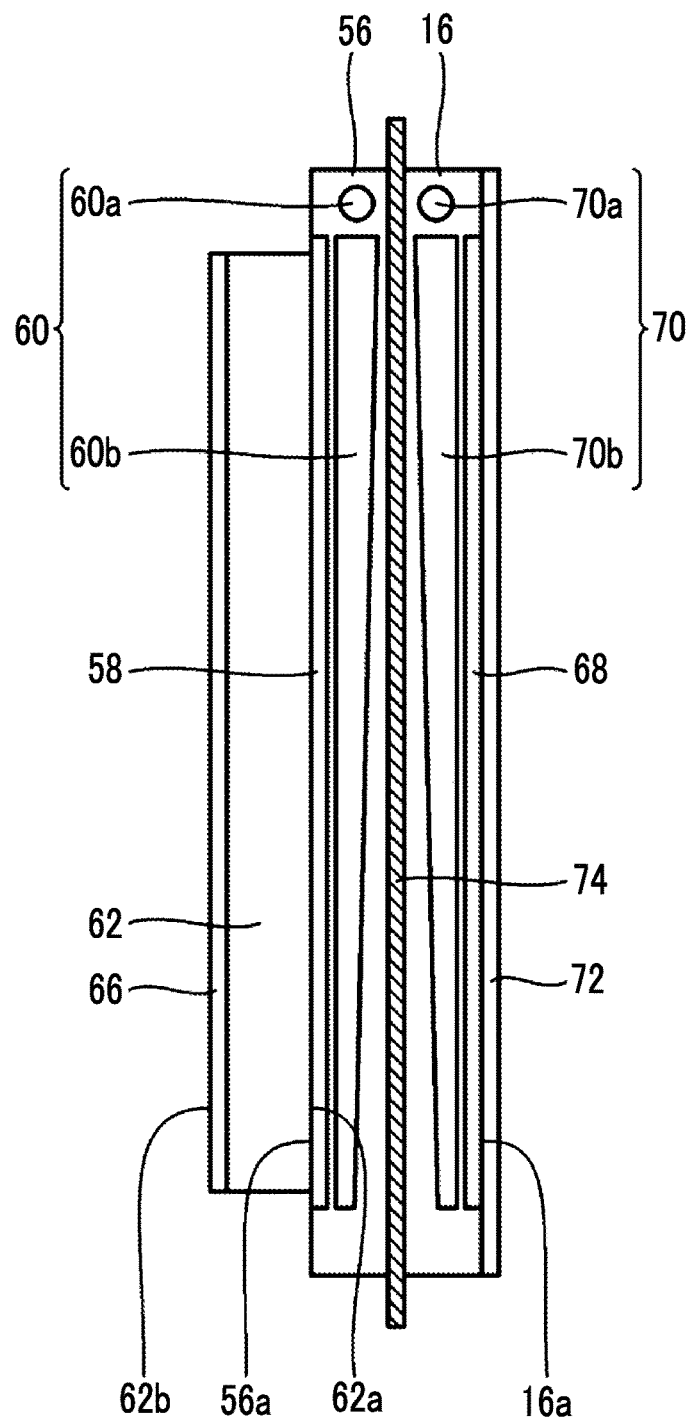
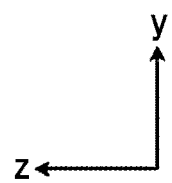

FIG. 14
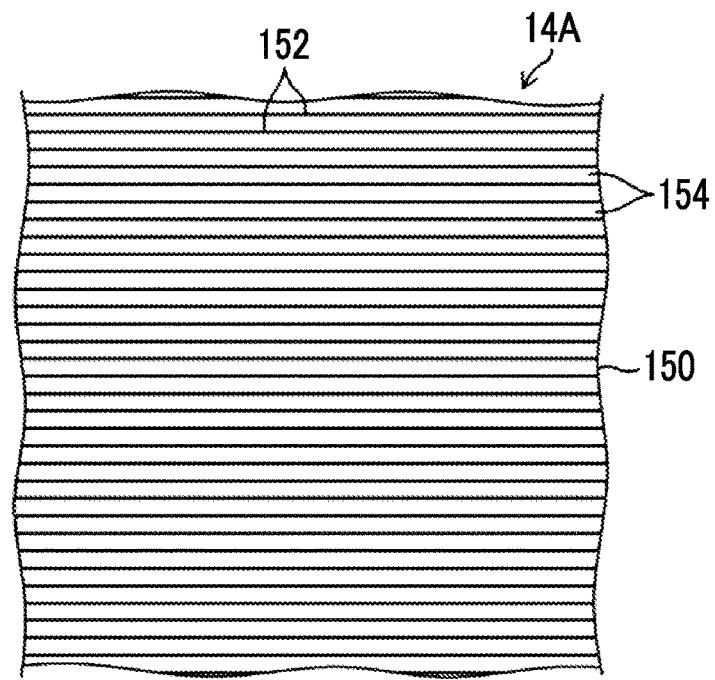
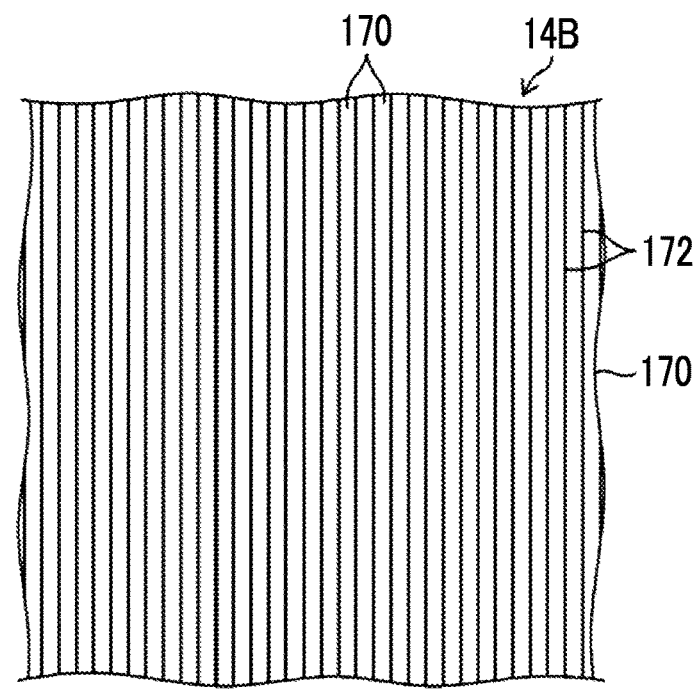
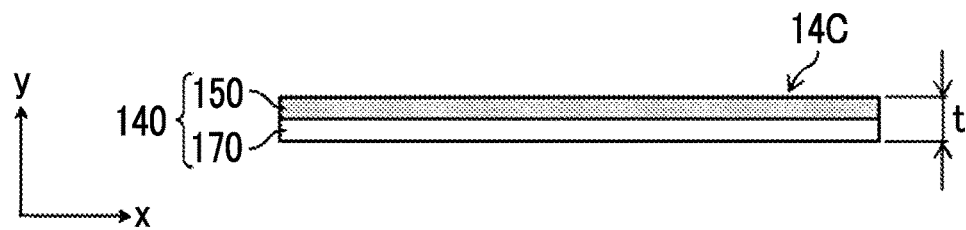

INPUT IMAGE                BLURRED IMAGE

HIGH-FREQUENCY
COMPONENT IMAGE

DISPLAYING IMAGE

PRINTER-EQUIPPED CAMERA AND DISPLAYING CONTROL METHOD THEREOF

CROSS-REFERENCE TO RELATED APPLICATIONS

This application is a Continuation of PCT International Application No. PCT/JP2019/035583 filed on Sep. 10, 2019, which claims priority under 35 U.S.C § 119(a) to Japanese Patent Application No. 2018-171716 filed on Sep. 13, 2018. Each of the above application(s) is hereby expressly incorporated by reference, in its entirety, into the present application.

BACKGROUND OF THE INVENTION

1. Field of the Invention

The present invention relates to a printer-equipped camera and a displaying control method thereof and particularly, to a printer-equipped camera that prints an image using an instant film, and a displaying control method thereof.

2. Description of the Related Art

A printer-equipped camera that incorporates a printer in a camera body and can instantly print a captured image on a medium has been known.

JP2001-045342A discloses that a printer-equipped camera that prints an image using an instant film incorporates an exposure display in a camera body and exposes a surface of the instant film using the exposure display.

SUMMARY OF THE INVENTION

In a case where the surface of the instant film is exposed using the display as in the printer-equipped camera disclosed in JP2001-045342A, light from each pixel of the display is diffused, thereby posing a defect of blurriness of the printed image.

The present invention is conceived in view of such a matter, and an object thereof is to provide a printer-equipped camera and a displaying control method thereof capable of printing a high quality image.

A printer-equipped camera of a first aspect comprises an instant film pack loading unit in which an instant film pack including an exposure opening is loaded, a first displaying unit of which a displaying surface is arranged to face an exposure surface of an instant film in the instant film pack through the exposure opening with respect to the instant film pack loaded in the instant film pack loading unit, and that exposes the instant film by displaying an image, a light exit direction restriction member that is included on the displaying surface of the first displaying unit and restricts a light exit direction of light from each pixel of the first displaying unit to a constant range, an imaging unit that electronically captures a subject image, a second displaying unit that displays an image to an outside, a print instruction unit that provides a print instruction for the image displayed on the second displaying unit, and a displaying control unit that exposes the exposure surface of the instant film by displaying the image on the first displaying unit, in a case where the print instruction is provided by the print instruction unit.

According to the first aspect, the instant film is exposed through the light exit direction restriction member by providing the print instruction for the image displayed on the second displaying unit and displaying the image on the first displaying unit. Accordingly, blurriness of an image to be recorded can be prevented, and a high quality image can be printed.

The printer-equipped camera of a second aspect further comprises an image processing unit that processes the image to be displayed on the first displaying unit, in which in a case of exposing the instant film, the displaying control unit exposes the exposure surface of the instant film by displaying, on the first displaying unit, an image that is different from the image captured by the imaging unit and displayed on the second displaying unit by performing image processing by the image processing unit. According to the second aspect, an image appropriate for exposure of the instant film can be exposed.

In the printer-equipped camera of a third aspect, the displaying control unit exposes the exposure surface of the instant film by displaying, on the first displaying unit, an image on which edge highlighting processing is performed by the image processing unit, compared to the image of the second displaying unit. According to the third aspect, blurriness caused by diffusion of light transmitted through the light exit direction restriction member can be suppressed.

In the printer-equipped camera of a fourth aspect, the image processing unit performs the edge highlighting processing using unsharp mask processing as the edge highlighting processing. According to the fourth aspect, a difference in density of a high-frequency component can be highlighted by the unsharp mask processing.

In the printer-equipped camera of a fifth aspect, the displaying control unit displays, on the first displaying unit, an image subjected to the unsharp mask processing, which is weighted in accordance with resolution of the first displaying unit, by the image processing unit, compared to the image of the second displaying unit. According to the fifth aspect, the unsharp mask processing weighted in accordance with the resolution can be performed.

The printer-equipped camera of a sixth aspect further comprises a film forwarding mechanism that forwards the instant film after exposure in a case where the print instruction is provided by the print instruction unit, and a film transport mechanism that discharges the instant film forwarded by the film forwarding mechanism while developing the instant film. According to the sixth aspect, the instant film can be forwarded and transported while being developed.

In the printer-equipped camera of a seventh aspect, the displaying control unit displays, on the first displaying unit, an image obtained by inverting the image displayed on the second displaying unit by the image processing unit. According to the seventh aspect, inversion processing can be performed as image processing.

In the printer-equipped camera of an eighth aspect, the displaying control unit controls displaying of the first displaying unit and the second displaying unit and switches OFF displaying of the second displaying unit while the instant film is exposed by displaying the image on the first displaying unit. According to the eighth aspect, displaying of the second displaying unit is switched OFF during exposure. Accordingly, a peak value of power can be reduced, and a power load can be reduced.

The printer-equipped camera of a ninth aspect further comprises an imaging control unit that controls ON and OFF of the imaging unit, in which the imaging control unit switches OFF the imaging unit during displaying of the image on the first displaying unit. According to the ninth aspect, the imaging unit is switched OFF during exposure.

Accordingly, the peak value of power can be more effectively reduced, and the power load can be reduced.

In the printer-equipped camera of a tenth aspect, the imaging control unit permits imaging even before the instant film pack is loaded in the instant film pack loading unit, or even in a case where an instant film before exposure is not present in the instant film pack. According to the tenth aspect, a captured image is stored even in a case where an instant film that can be exposed is not present.

The printer-equipped camera of an eleventh aspect further comprises a mode switching unit that switches between an imaging mode and a playback mode, in which in a case where the imaging mode is set, the displaying control unit displays a captured image on the second displaying unit as an image of a print target, and in a case where the playback mode is set, the displaying control unit displays an image stored in an image storage unit on the second displaying unit as the image of the print target.

According to the eleventh aspect, the captured image can be displayed on the second displaying unit by setting the imaging mode. In addition, the image stored in the image storage unit can be displayed on the second displaying unit by setting the playback mode.

In the printer-equipped camera of a twelfth aspect, the displaying control unit displays information related to imaging on the second displaying unit. According to the twelfth aspect, imaging of a user can be assisted.

The printer-equipped camera of a thirteenth aspect further comprises a touch operation detection unit that detects a touch operation performed on a displaying surface of the second displaying unit. According to the thirteenth aspect, the touch operation detection unit is comprised on the displaying surface of the second displaying unit.

In the printer-equipped camera of a fourteenth aspect, the light exit direction restriction member is a louver member or a porous plate. According to the fourteenth aspect, the light exit direction restriction member is configured with the louver member or the porous plate.

A displaying control method of a printer-equipped camera of a fifteenth aspect is a displaying control method of a printer-equipped camera including a first displaying unit that includes, on a displaying surface, a light exit direction restriction member restricting a light exit direction of light from each pixel to a constant range and exposes a surface of an instant film by displaying an image, and a second displaying unit that displays an image to an outside, the displaying control method comprising exposing the instant film by displaying the image on the first displaying unit by providing a print instruction for the image displayed on the second displaying unit.

According to the fifteenth aspect, the instant film is exposed through the light exit direction restriction member by providing the print instruction for the image displayed on the second displaying unit and displaying the image on the first displaying unit. Accordingly, blurriness of an image to be recorded can be prevented, and a high quality image can be printed.

In the displaying control method of the printer-equipped camera of a sixteenth aspect, the instant film is exposed by displaying, on the first displaying unit, an image obtained by performing image processing on the image displayed on the second displaying unit.

According to the sixteenth aspect, an image appropriate for exposure can be exposed on the instant film.

According to the present invention, a printer-equipped camera and a displaying control method thereof capable of printing a high quality image can be provided.

BRIEF DESCRIPTION OF THE DRAWINGS

FIG. 10 is a diagram illustrating a schematic configuration of an exposure display and a image displaying display.

FIG. 14 is a descriptive diagram for describing a stack of the louver members.

DESCRIPTION OF THE PREFERRED EMBODIMENTS

Hereinafter, a preferred embodiment of the present invention will be described in detail in accordance with the appended drawings.

[Exterior Configuration]

Figure 1:
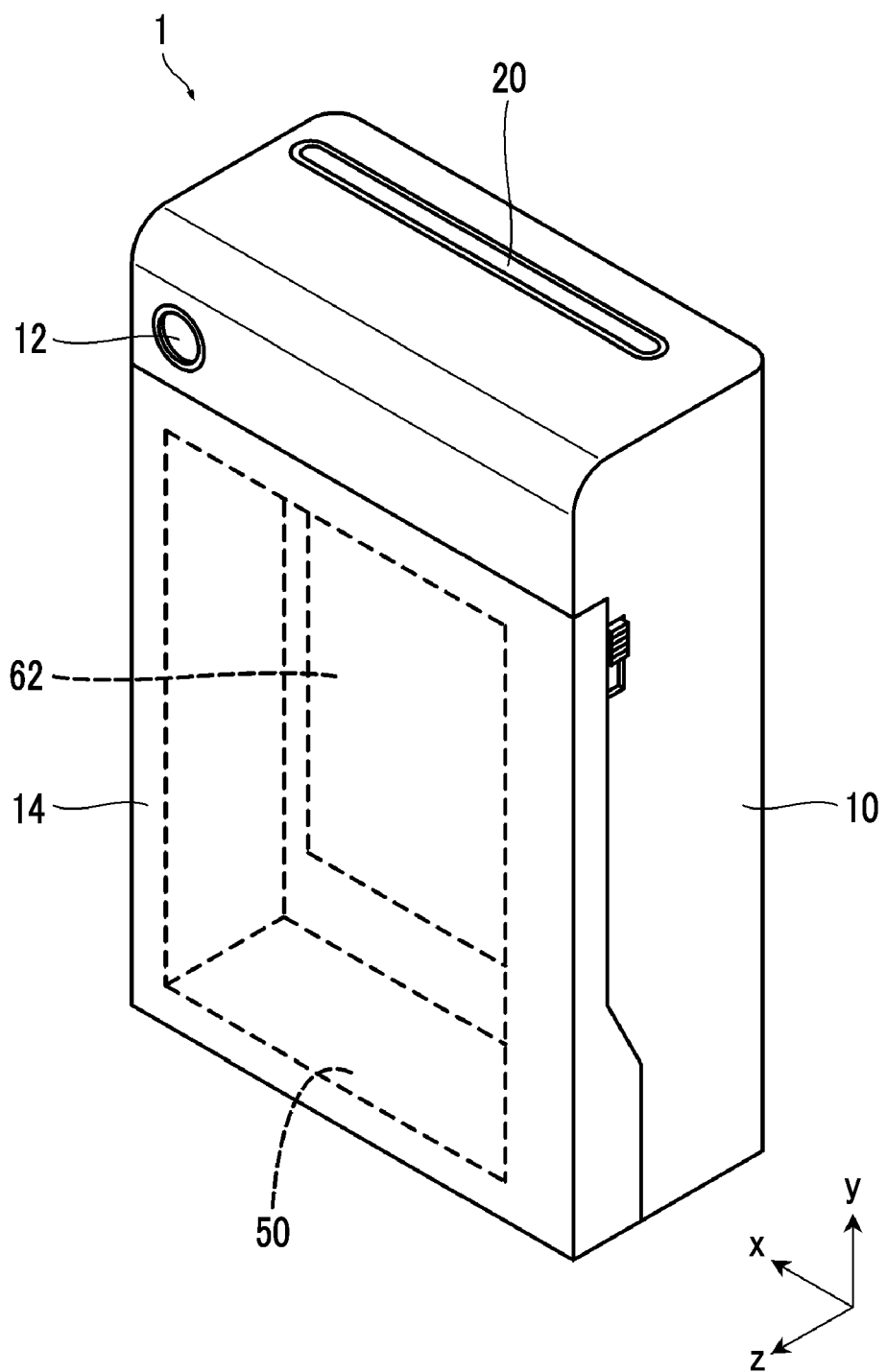
FIG. 1 is a perspective front view illustrating an exterior configuration of one embodiment of a printer-equipped camera.
Figure 2:
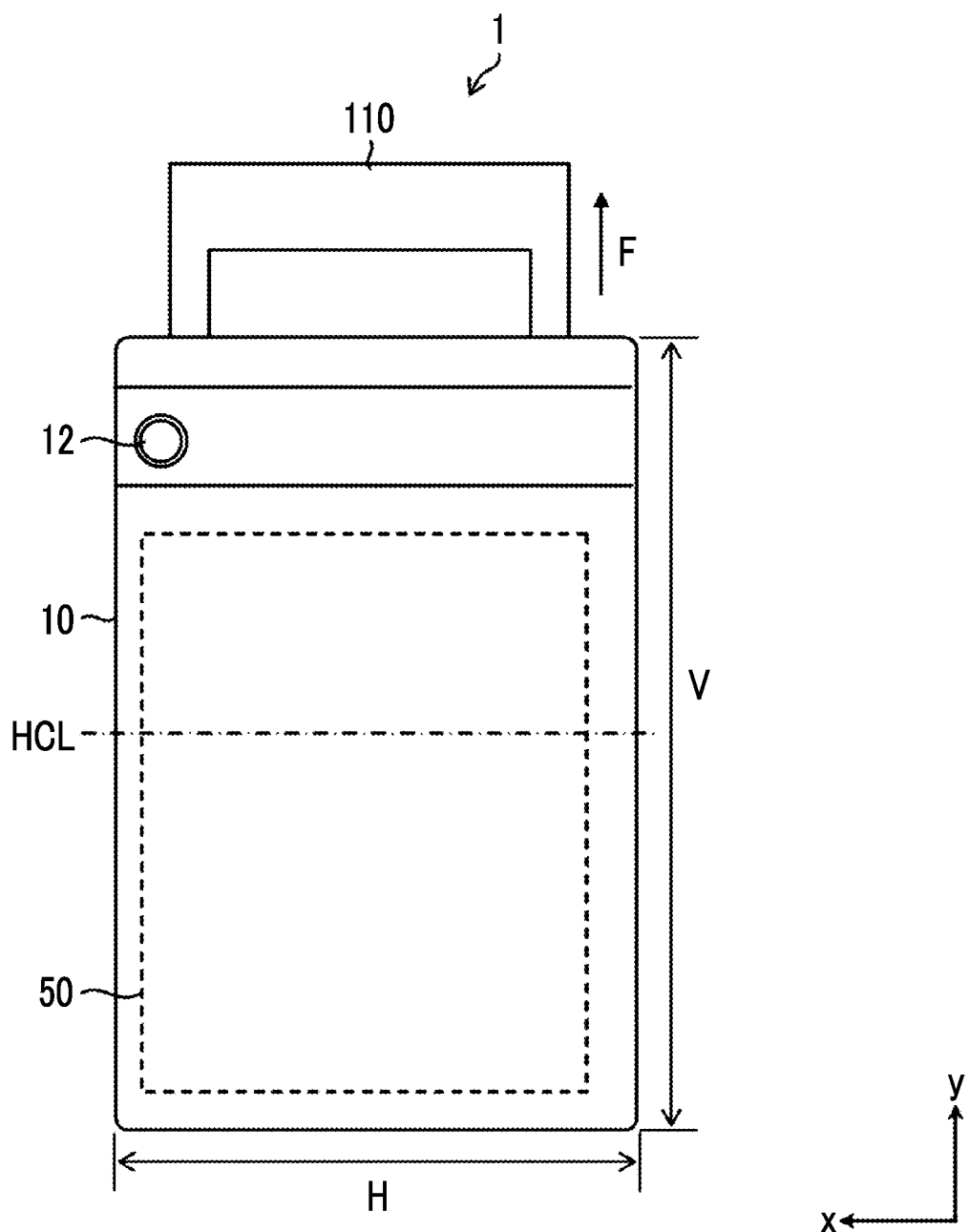
FIG. 2 is a front view of the printer-equipped camera illustrated in FIG. 1.
Figure 3:
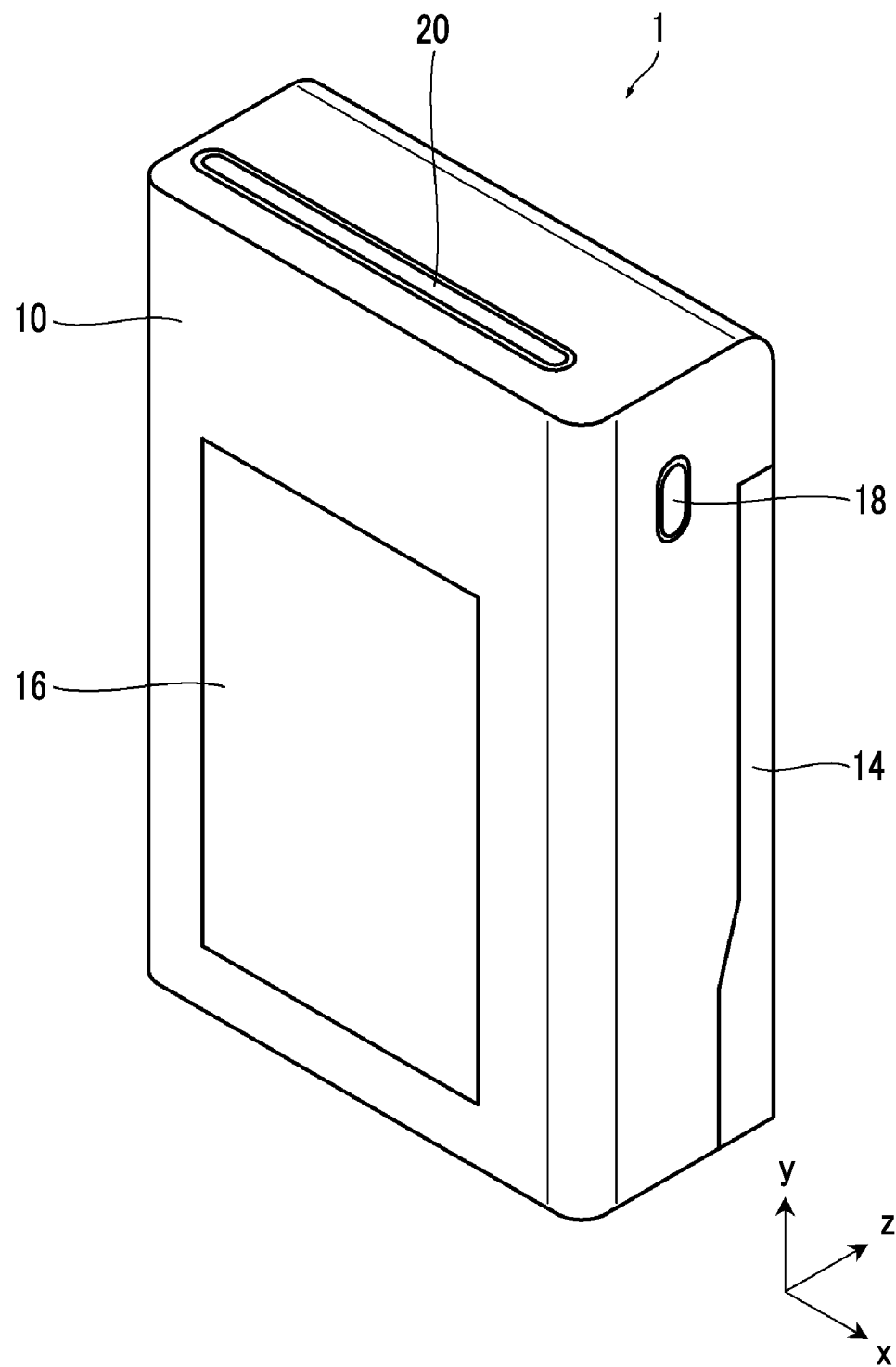
FIG. 3 is a perspective rear view of the printer-equipped camera illustrated in FIG. 1.

FIG. 1 is a perspective front view illustrating an exterior configuration of one embodiment of a printer-equipped camera. FIG. 2 is a front view of the printer-equipped camera illustrated in FIG. 1. FIG. 3 is a perspective rear view of the printer-equipped camera illustrated in FIG. 1. In FIG. 1 to FIG. 3, a direction indicated by arrow x is a left-right direction of a printer-equipped camera 1. A direction indicated by arrow y is an up-down direction of the printer-equipped camera 1. A direction indicated by arrow z is a forward-rearward direction of the printer-equipped camera 1. The left-right direction has the same meaning as a horizontal direction, a lateral direction, or a width direction. The up-down direction has the same meaning as a vertical direction, a height direction, or a longitudinal direction. The forward-rearward direction has the same meaning as an optical axis direction or a depth direction.

The printer-equipped camera 1 of the present embodiment is a printer-equipped camera that prints an image using an instant film. The instant film is loaded in the printer-equipped camera 1 in a form of an instant film pack.

As illustrated in FIG. 1 to FIG. 3, the printer-equipped camera 1 includes a portable camera body 10.

An imaging lens 12, a film lid cover 14, and the like are comprised on a front surface side of the camera body 10. The film lid cover 14 is a cover that opens and closes a film loading chamber. The film lid cover 14 is disposed to be openable and closable through a hinge 14a (refer to FIG. 6) comprised on a bottom surface of the camera body 10. As will be described later, the imaging lens 12 and an image sensor 42 constitute an imaging unit that electronically captures a subject image. An optical axis of the imaging unit is an optical axis of the imaging lens 12.

An image displaying display 16 is comprised on a rear surface side of the camera body 10. The image displaying display 16 is one example of a second displaying unit. The image displaying display 16 is used as not only a live view monitor in a case of imaging but also a playback monitor or the like in a case of viewing a captured image. Live view is a function of displaying an image captured by the image sensor in real time. The image displaying display 16 is configured with a touch panel display. Accordingly, the image displaying display 16 also functions as an operation unit.

A power button 18 is comprised on a side surface on a single side of the camera body 10. The printer-equipped camera 1 is powered ON and OFF by pushing the power button 18 for a long time.

A film discharge port 20 is comprised on an upper surface of the camera body 10. The film discharge port 20 is configured with a slit through which an instant film 110 can pass. The printed instant film 110 is discharged from the film discharge port 20.

As illustrated in FIG. 2, in a case where an axis intersecting with the optical axis (z direction) of the imaging lens 12 in the vertical direction is denoted by a vertical axis V (y direction) and an axis perpendicularly intersecting with each of the optical axis of the imaging lens 12 and the vertical axis V is denoted by a horizontal axis H (x direction), the camera body 10 is a longitudinal casing of which a length along the vertical axis V is greater than a length along the horizontal axis H. In a state where the camera body 10 is installed in a direction of normal use, the imaging lens 12 and the film discharge port 20 (not illustrated) are arranged on an upper portion side of the camera body 10. The instant film 110 is discharged from the film discharge port 20 in a direction of a forwarding direction F indicated by an arrow along the vertical axis V. The upper portion side means the opposite side to the installation surface between which the horizontal center line HCL passing through the center of the camera body 10 in parallel with the horizontal axis H is interposed in a state where the camera body 10 is installed in the direction of normal use (state of installation where the horizontal axis H is horizontal with respect to the installation surface). The direction indicated by the forwarding direction F is a forwarding direction of the instant film 110.

Figure 4:
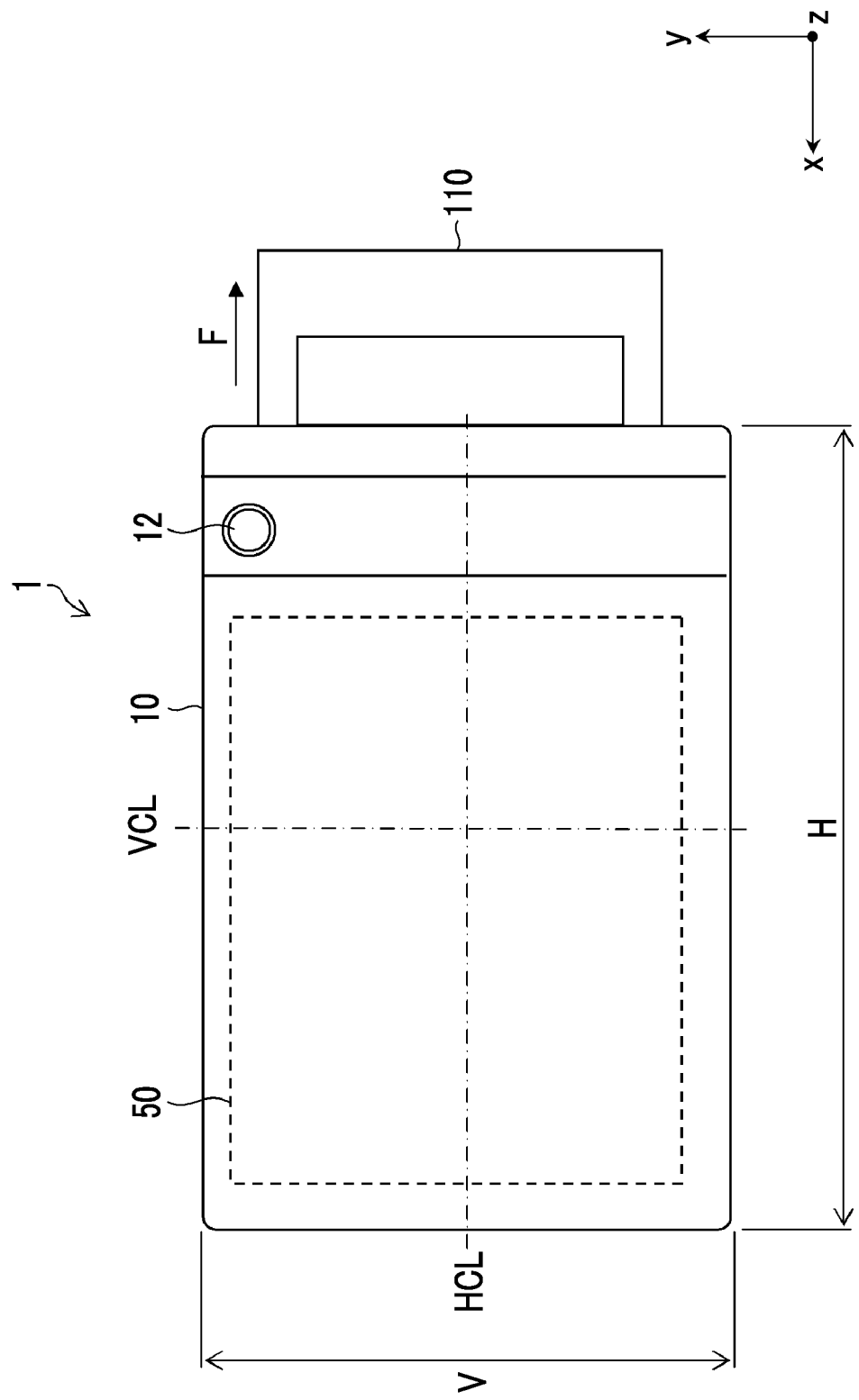
FIG. 4 is a front view illustrating an exterior configuration of another embodiment of the printer-equipped camera.

FIG. 4 is a front view illustrating an exterior configuration of another embodiment of the printer-equipped camera. In a case where the axis intersecting with the optical axis (z direction) of the imaging lens 12 in the vertical direction is denoted by the vertical axis V (y direction) and the axis perpendicularly intersecting with each of the optical axis of the imaging lens 12 and the vertical axis V is denoted by the horizontal axis H (x direction), the camera body 10 is a lateral casing of which the length along the horizontal axis H is greater than the length along the vertical axis V. In a state where the camera body 10 is installed in the direction of normal use, the imaging lens 12 is arranged on the upper portion side. The film discharge port 20 (not illustrated) is arranged in a side portion (side surface) on the same side as the imaging lens 12. The instant film 110 is discharged from the film discharge port 20 in the direction of the forwarding direction F along the horizontal axis H. The upper portion side means the opposite side to the installation surface between which the horizontal center line HCL passing through the center of the camera body 10 in parallel with the horizontal axis H is interposed in a state where the camera body 10 is installed in the direction of normal use (state of installation where the horizontal axis H is horizontal with respect to the installation surface).

The same side means one side of vertical center line VCL as a boundary passing through the center of the camera body 10 in parallel with the vertical axis V in a state where the camera body 10 is installed in the direction of normal use.

Figure 7:
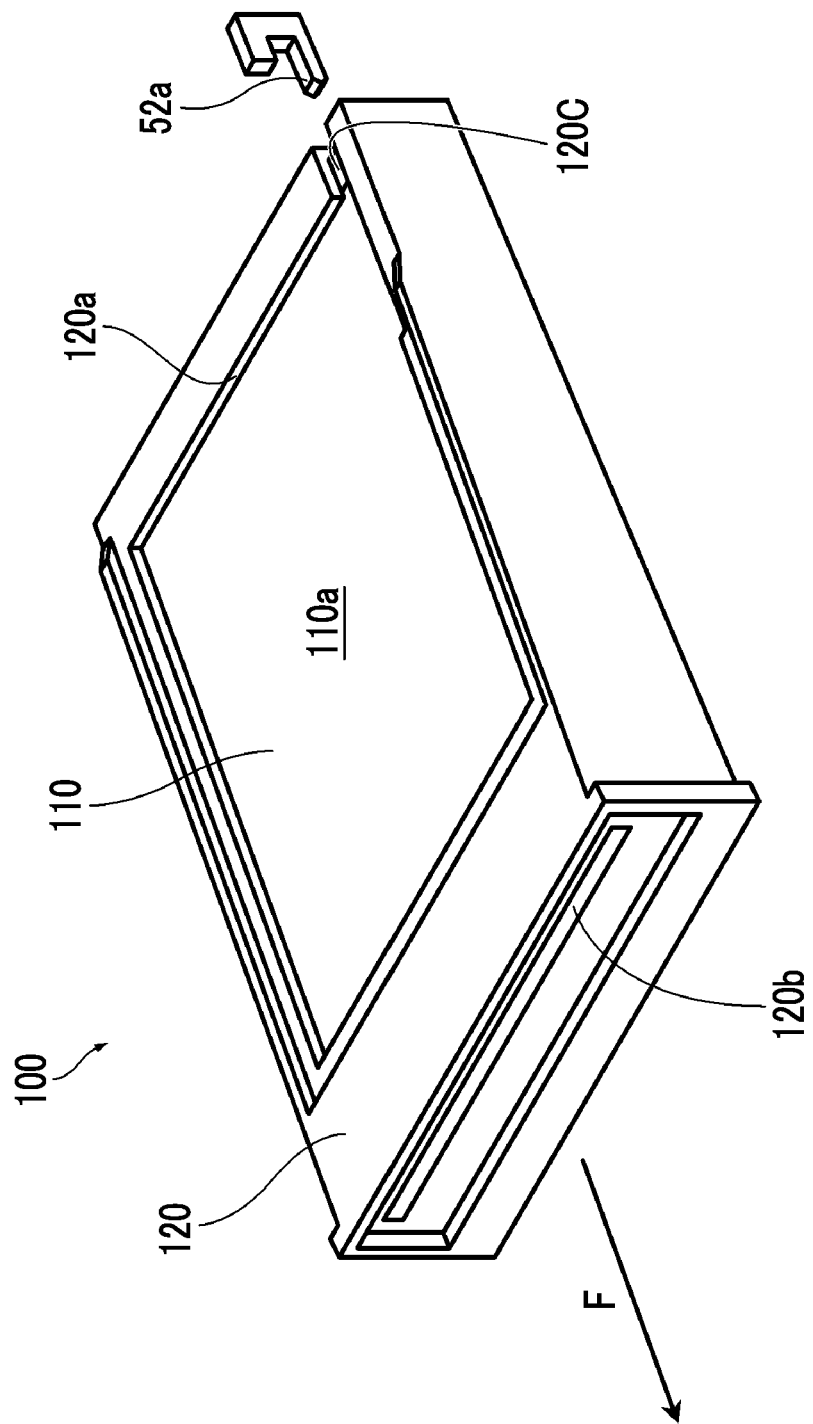
FIG. 7 is a perspective view of an instant film pack.

As illustrated in FIG. 2 and FIG. 4, the printer-equipped camera 1 comprises a film loading chamber 50 that is a loading unit (instant film pack loading unit) for an instant film pack 100 (refer to FIG. 7). The imaging unit including the imaging lens 12, and the film loading chamber 50 are present at different positions in a front view. Different positions mean a positional relationship in which the imaging unit and the film loading chamber 50 do not overlap in a front view. Such arrangement enables reduction of a length of the printer-equipped camera 1 in the depth direction and can achieve a thin printer-equipped camera 1.

[Internal Structure]

Figure 5:
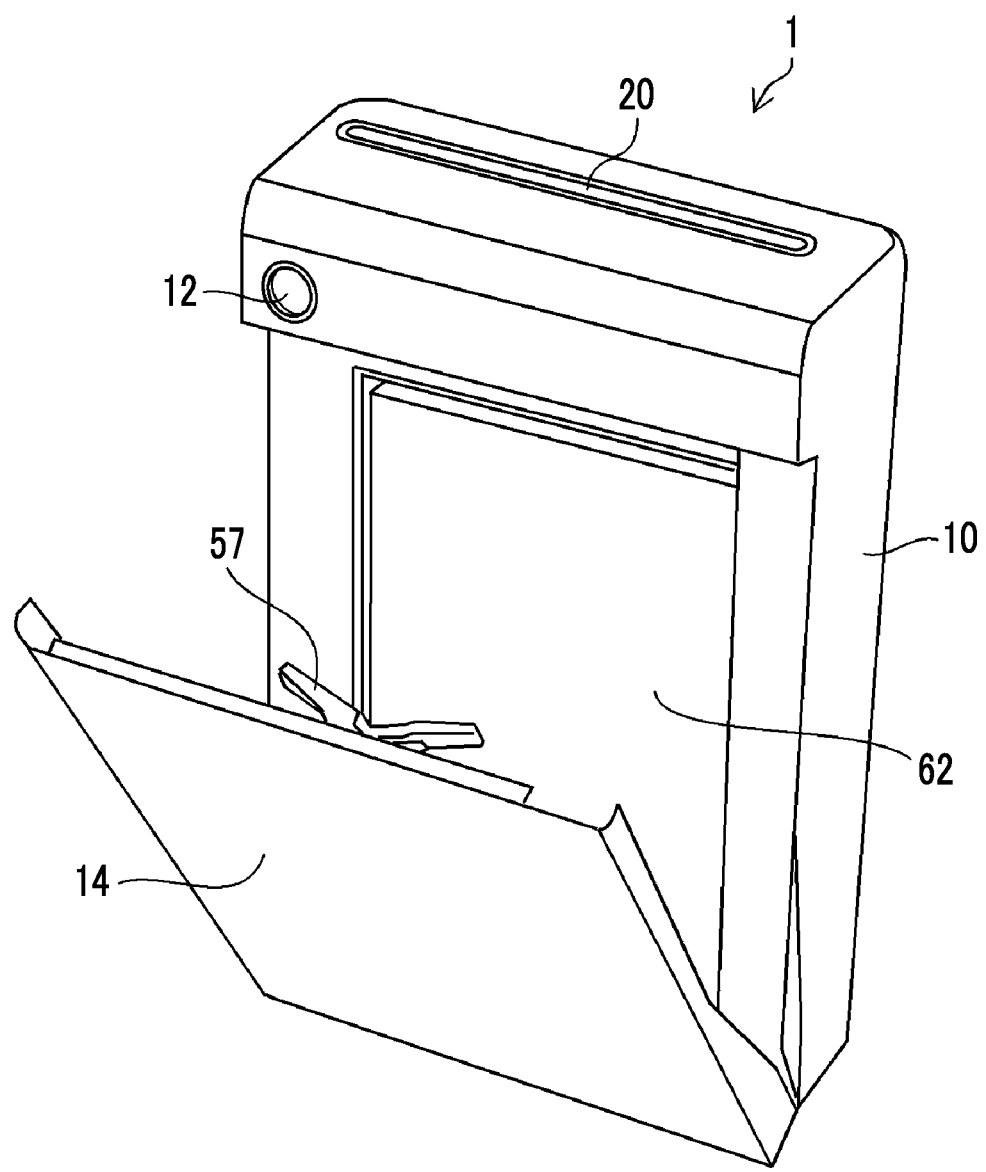
FIG. 5 is a perspective view illustrating a state where a film lid cover of the printer-equipped camera illustrated in FIG. 1 is open.
Figure 6:
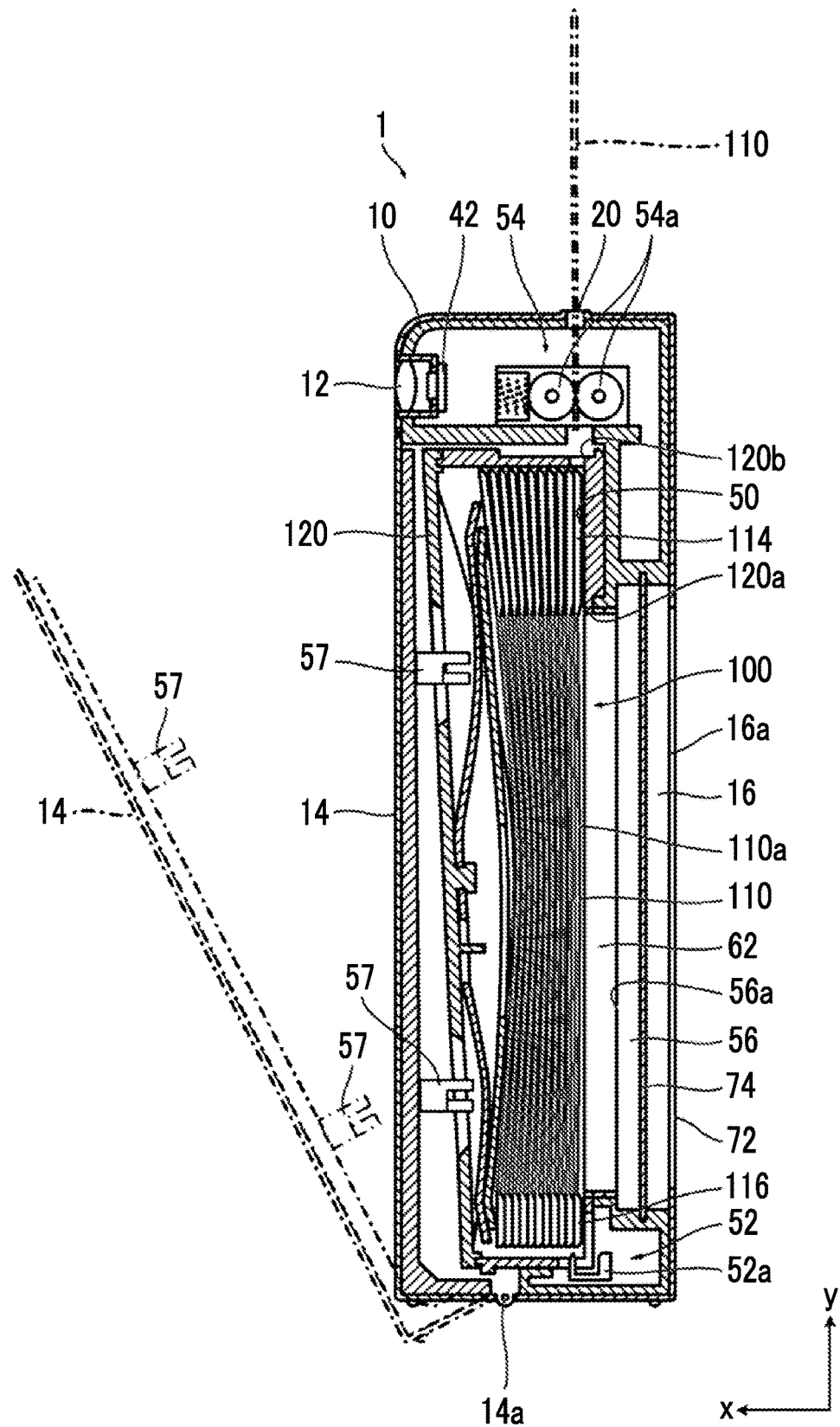
FIG. 6 is a cross-sectional view illustrating a schematic configuration of an inside of the printer-equipped camera.

FIG. 5 is a perspective view illustrating a state where the film lid cover of the printer-equipped camera is open. FIG. 6 is a cross-sectional view illustrating a schematic configuration of an inside of a printer-equipped digital camera. FIG. 5 illustrates a state before the instant film pack 100 is loaded. The printer-equipped camera 1 comprises the imaging lens 12, the image sensor 42, and the like as a constituent related to a camera. The film loading chamber 50, a film forwarding mechanism 52, a film transport mechanism 54, an exposure display 56, a spring mechanism 57 disposed in the film lid cover 14, and the like are comprised as a constituent related to a printer. The image displaying display 16 is comprised as a constituent common to the camera and the printer.

<Imaging Lens>

The imaging lens 12 forms an optical image of a subject on a light receiving surface of the image sensor 42. The imaging lens 12 has a focal point adjusting function and is configured to include a stop and a shutter, not illustrated.

<Image Sensor>

For example, the image sensor 42 is configured with a two-dimensional solid-state imaging element such as a charge coupled device (CCD) image sensor or a complementary metal oxide semiconductor (CMOS) image sensor. The image sensor 42 has an imaging region that has an aspect ratio corresponding to a printable region of the instant film to be used.

In the printer-equipped camera 1 of the present embodiment, the imaging lens 12 and the image sensor 42 constitute the imaging unit that electronically captures the subject image.

<Film Loading Chamber>

The film loading chamber 50 is the loading unit (instant film pack loading unit) for the instant film pack 100. The film loading chamber 50 is configured with a recess portion and is open and closed by the film lid cover 14. The recess portion has a shape in which the instant film pack 100 fits, and is airtightly closed in a darkroom state by closing the film lid cover 14. The film lid cover 14 fixes the instant film pack 100 in the film loading chamber 50. The spring mechanism 57 disposed in the film lid cover 14 fixes separated arrangement positions of an exposure surface of the instant film 110 and a light exit direction restriction member, described later, in a state where the film lid cover 14 is closed. The instant film 110 is only required to be biased toward the light exit direction restriction member, and a structure of the spring mechanism 57 is not particularly limited. For example, a spring mechanism including a pair of lever members having push units in opposite directions to each other and a spring biasing the lever members may be used, or a spring mechanism including a pin and a coil spring biasing the pin may be used.

<Instant Film Pack>

The instant film pack 100 has a structure in which a plurality of the instant films 110 are accommodated in a case 120.

Figure 8:
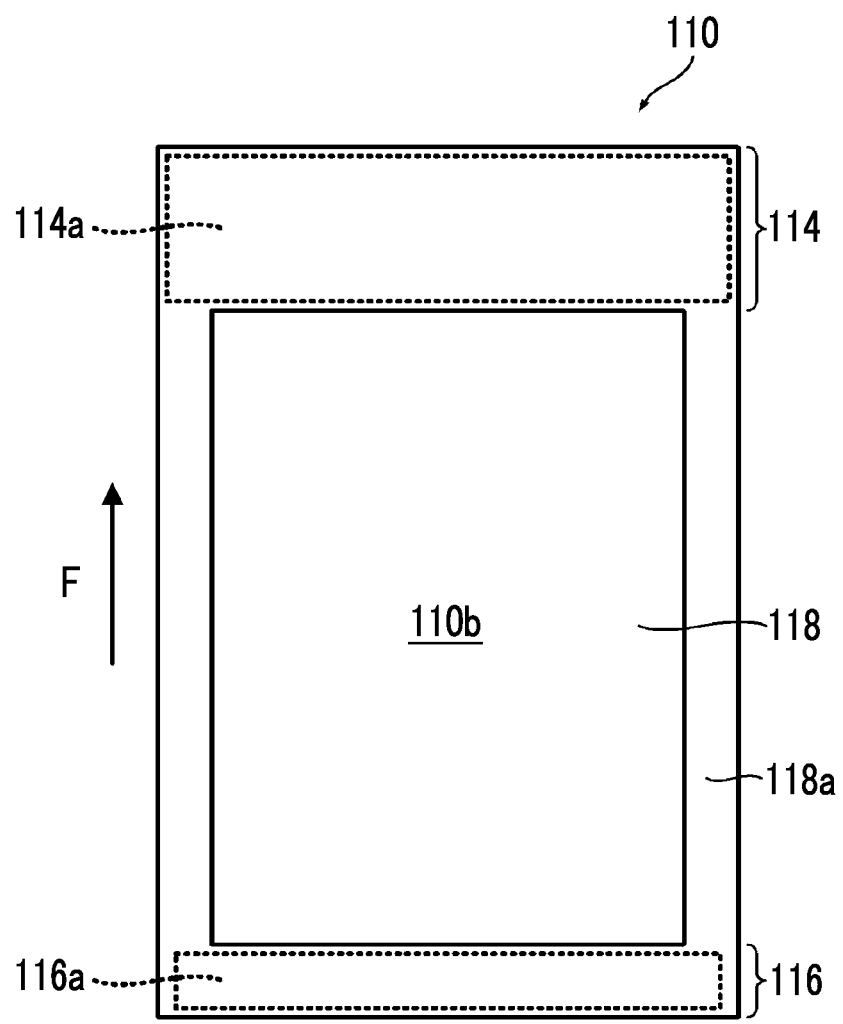
FIG. 8 is a front view of an instant film.
Figure 9:
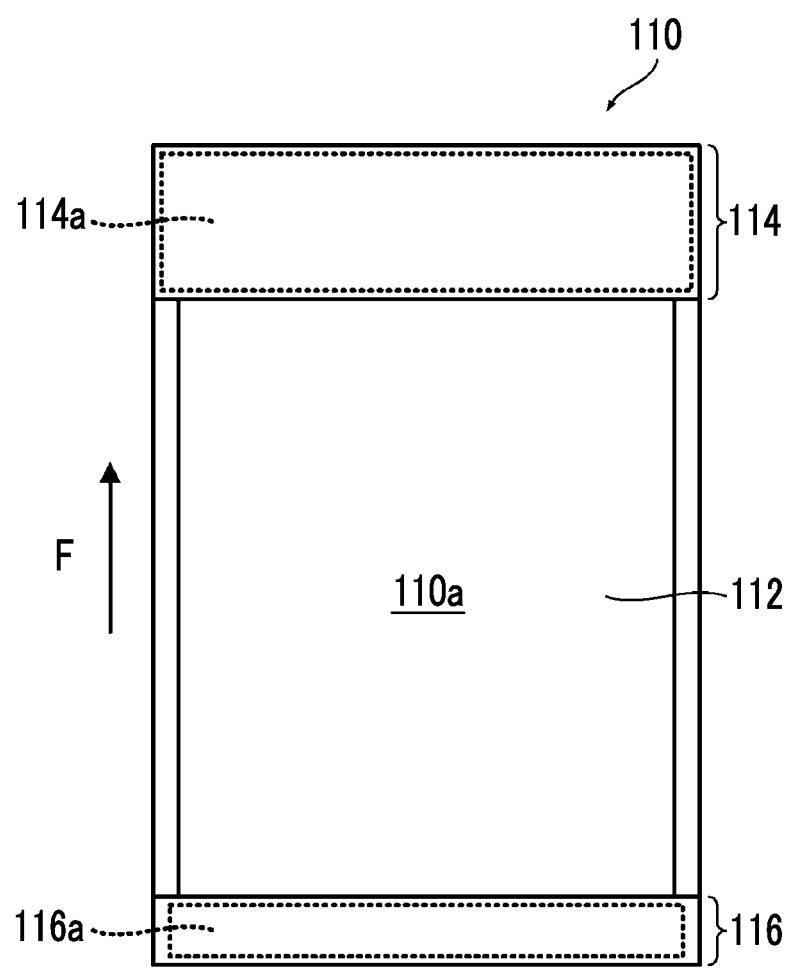
FIG. 9 is a rear view of the instant film.

FIG. 7 is an exploded perspective view of the instant film pack. FIG. 8 is a front view of the instant film. FIG. 9 is a rear view of the instant film. In FIG. 7 to FIG. 9, the direction indicated by the forwarding direction F is the forwarding direction of the instant film 110. The instant film 110 is forwarded in the direction indicated by the forwarding direction F and is discharged from the case 120.

The instant film 110 is a so-called "mono-sheet type" (referred to as a sheet film type, an integral film, or the like) instant film and is an instant film of a type in which an image appears on a back of the exposure surface. The instant film 110 has a rectangular card shape. A surface of the instant film 110 on one side is configured as an exposure surface 110*a*, and a surface of the instant film 110 on the other side is configured as an observation surface 110*b*. The exposure surface 110*a* is a surface on which an image is recorded by exposure, and the observation surface 110*b* is a surface on which the recorded image is observed.

As illustrated in FIG. 9, an exposure region 112, a pod portion 114, and a trap portion 116 are comprised on the exposure surface 110*a* of the instant film 110.

The exposure region 112 is a region in which the image is recorded by exposure. The exposure region 112 is the printable region of the instant film 110. The pod portion 114 and the trap portion 116 are arranged ahead and behind each other in the forwarding direction F with the exposure region 112 interposed therebetween.

The pod portion 114 is arranged ahead of the exposure region 112 in the forwarding direction F. The pod portion 114 incorporates a developing treatment liquid pod 114*a* that contains developing treatment liquid.

The trap portion 116 is arranged behind the exposure region 112 in the forwarding direction F. The trap portion 116 incorporates an absorbent material 116*a*.

As illustrated in FIG. 8, an observation region 118 is comprised on the observation surface 110*b* of the instant film 110. The observation region 118 is a region in which the image is displayed. By performing developing treatment on the exposure region 112, the image is displayed in the observation region 118. The observation region 118 is arranged in correspondence with the exposure region 112. A frame 118*a* is comprised around the observation region 118. Accordingly, the image is displayed within the frame.

The instant film 110 is viewed in a direction in which the trap portion 116 is up and the pod portion 114 is down. Accordingly, the image is printed in a direction in which trap portion 116 is up and the pod portion 114 is down.

After the exposure, the instant film 110 is subjected to the developing treatment by spreading the developing treatment liquid of the pod portion 114 in the exposure region 112. The developing treatment liquid of the pod portion 114 is squeezed from the pod portion 114 and spread in the exposure region 112 by causing the instant film 110 to pass between a spreading roller pair 54*a* that is a pair of rollers. The developing treatment liquid that is left at a time of spreading processing is trapped in the trap portion 116.

The case 120 has a rectangular box shape. The case 120 includes a rectangular exposure opening 120*a* (exposure opening of the instant film pack 100) in a front surface part. In addition, the case 120 includes a slit-shaped discharge port 120*b* in a ceiling surface part. The instant film 110 is stacked and accommodated in the case with the exposure surface 110*a* facing a front surface side (exposure opening 120*a* side) of the case 120 and the pod portion 114 facing a ceiling surface side (discharge port 120*b* side) of the case 120. In addition, the case 120 includes a slit-shaped claw opening portion 120*c* in a bottom surface part. The instant film 110 accommodated in the case 120 is forwarded one sheet at a time toward the discharge port 120*b* and discharged from the discharge port 120*b* by causing a claw 52*a* to advance from the claw opening portion 120*c*.

One instant film pack 100 accommodates a plurality (for example, 10) of the instant films 110.

<Film Forwarding Mechanism>

The film forwarding mechanism 52 forwards the instant film 110 one sheet at a time from the instant film pack 100 loaded in the film loading chamber 50 in order from a top of a stack direction. The film forwarding mechanism 52 comprises the claw 52*a* that moves forward and rearward in the forwarding direction F of the instant film 110, and forwards the instant film 110 from the instant film pack 100 by scraping the instant film 110 in the case by the claw 52*a* one sheet at a time from the top of the stack direction.

<Film Transport Mechanism>

The film transport mechanism 54 transports the instant film 110 that is forwarded from the instant film pack 100 by the film forwarding mechanism 52. The film transport mechanism 54 comprises the spreading roller pair 54*a*. The spreading roller pair 54a rotates by being driven by a motor, not illustrated, and pinches and transports the instant film 110. The instant film 110 is subjected to the developing treatment while being transported by the spreading roller pair 54a. That is, the developing treatment liquid in the pod portion is subjected to the spreading processing by crushing the pod portion 114 by the spreading roller pair 54a.

<Exposure Display>

The exposure display 56 is a display for recording the image on the instant film 110. The exposure display 56 records the image on the instant film 110 by exposing the instant film 110 by displaying the image. The exposure display 56 is one example of a first displaying unit. The exposure display 56 is comprised in a bottom surface portion of the film loading chamber 50. In a case where the instant film pack 100 is loaded in the film loading chamber 50, the exposure surface 110a of the instant film 110 accommodated inside the case 120 is arranged to face a displaying surface 56a of the exposure display 56 through the exposure opening 120a. The exposure display 56 has a size in which the instant film 110 can be exposed in one exposure. Accordingly, the displaying surface 56a that has a size greater than at least the observation region 118 of the instant film 110 is included.

The exposure display 56 is configured with a transmissive color liquid crystal display (LCD) comprising a backlight.

FIG. 10 is a diagram illustrating a schematic configuration of the exposure display and the image displaying display.

As illustrated in the drawing, the exposure display 56 comprises an exposure liquid crystal display 58 and an exposure backlight 60. The exposure liquid crystal display 58 is configured with a transmissive color liquid crystal display. The exposure backlight 60 evenly irradiates an entire surface of a display region of the exposure liquid crystal display 58 with light from a rear of the exposure liquid crystal display 58. The exposure backlight 60 comprises a rod-shaped lamp 60a that is a light source, and a light guide plate 60b that evenly guides light exiting from the rod-shaped lamp 60a to the entire surface of the display region of the exposure liquid crystal display 58.

A louver member 62 is comprised on the displaying surface 56a of the exposure display 56. The louver member 62 restricts a light exit direction of light from each pixel of the exposure display 56 to a constant range. The louver member 62 is one example of a light exit direction restriction member. The louver member 62 has a thin plate shape that is an exterior shape corresponding to the exposure opening 120a of the instant film pack 100.

The louver member 62 is arranged at a position that fits in the exposure opening 120a in a case where the instant film pack 100 is loaded in the film loading chamber 50. The louver member 62 is oppositely arranged to be spaced from the exposure surface 110a of the instant film 110 accommodated in the case 120.

A plurality of pixels of the exposure display 56 are two-dimensionally arranged in the x direction and the y direction. Considering recording on the instant film, a pixel pitch (distance between adjacent pixels) of the exposure display 56 is preferably less than or equal to 200 µm. In order to obtain a more favorable image, the pixel pitch is preferably less than or equal to 150 µm, more preferably less than or equal to 125 µm, and still more preferably less than or equal to 85 µm.

The louver member 62, like the exposure display 56, has a size in which the instant film 110 can be exposed in one exposure. Accordingly, the louver member 62 has a size that is greater than at least the observation region 118 of the instant film 110. The louver member 62 may be smaller than the exposure region 112 or greater than the exposure region 112, provided that the louver member 62 has a size greater than the observation region 118.

Figure 11:
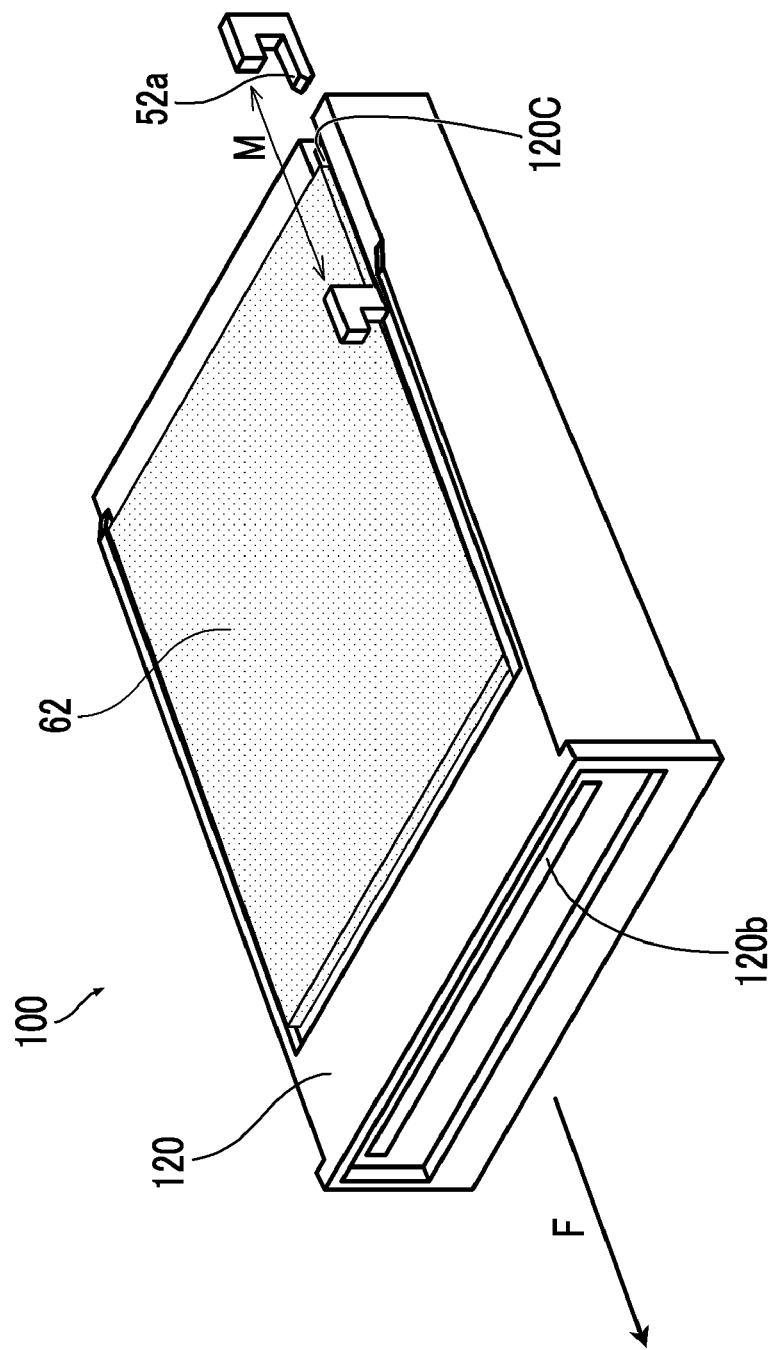
FIG. 11 is a perspective view illustrating a size relationship between a louver member and the instant film pack.

FIG. 11 is a perspective view illustrating a size relationship between the louver member 62 and the instant film pack 100. As illustrated in FIG. 11, the louver member 62 has a size that fits in the exposure opening 120a of the case 120 of the instant film pack 100. The louver member 62 is arranged at a position away from a movement trajectory M, indicated by an arrow, of the claw 52a discharging the instant film 110 from the instant film pack 100. The claw 52a can discharge the instant film 110 from the instant film pack 100 without being obstructed by the louver member 62.

Figure 12:
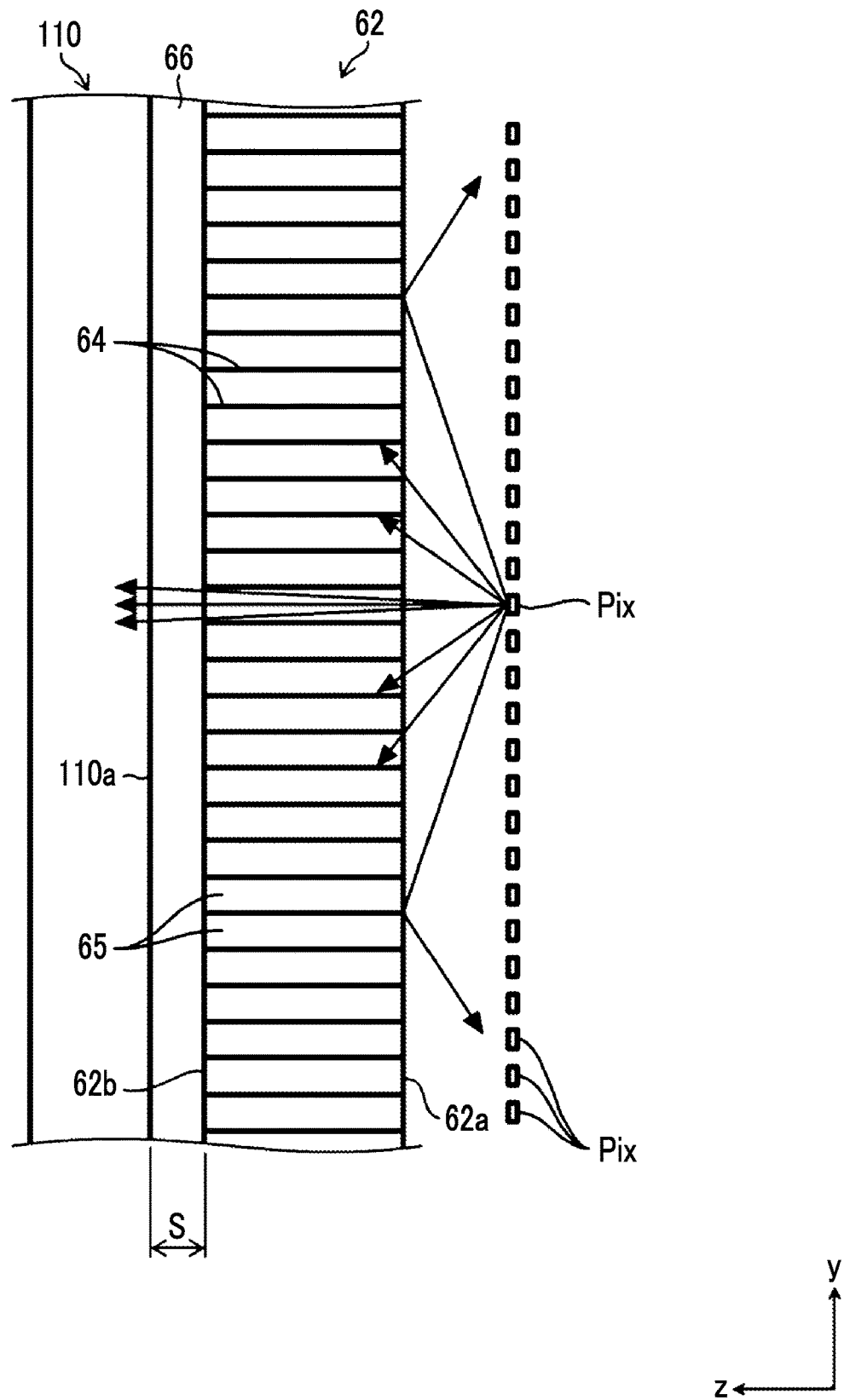
FIG. 12 is an enlarged cross-sectional view of a part of the louver member.
Figure 13:
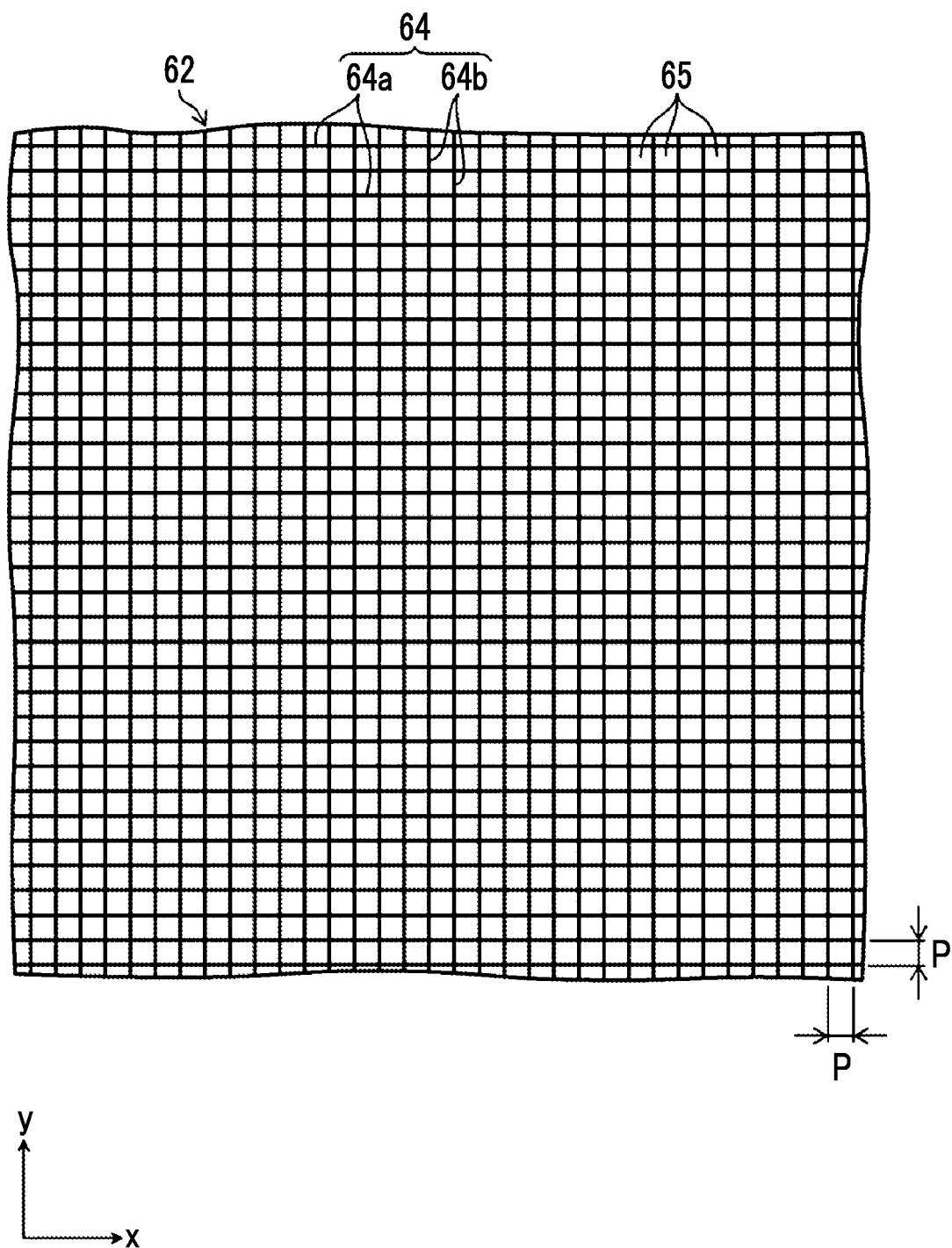
FIG. 13 is an enlarged front view of a part of the louver member.

FIG. 12 is an enlarged cross-sectional view of a part of the louver member. FIG. 13 is an enlarged front view of a part of the louver member. The light exit direction restriction member illustrated in FIG. 12 and FIG. 13 is configured with the louver member 62 having a single layer structure.

As illustrated in FIG. 12, the louver member 62 includes two opposite main surfaces. One main surface constitutes an incidence surface 62a, and the other main surface constitutes an exit surface 62b. The incidence surface 62a is a surface that is arranged to face the displaying surface 56a of the exposure display 56, and the exit surface 62b is a surface that is arranged to face the exposure surface 110a of the instant film 110.

The louver member 62 has a function of restricting the light exit direction of the light from each pixel of the exposure display 56 to the constant range. A shape of the louver member 62 is not limited, provided that the louver member 62 has such a function. For example, the louver member 62 may have a film shape having flexibility or a plate shape having stiffness.

A protective film 66 is comprised on an exit surface 62b side of the louver member 62 as a protective member.

The protective film 66 causes the louver member 62 and the exposure surface 110a of the instant film 110 to be spaced by a constant distance S. The distance S is the same as a thickness of the protective film 66.

The louver member 62 is configured with a light blocking portion 64 having a lattice form and a light transmitting portion 65 divided by the light blocking portion 64. The light blocking portion 64 having a lattice form is configured with a plurality of first light blocking portions 64a that extend in the x direction (first direction) and are arranged to be spaced in the y direction (second direction), and a plurality of second light blocking portions 64b that extend in the y direction (second direction) and are arranged to be spaced in the x direction (first direction). The light blocking portion 64 may be a light absorbent member that absorbs light, or can be a light reflective member that reflects light. A colored resin material can be used as a material constituting the light blocking portion 64. For example, black silicone rubber can be used.

A neutral density filter (ND filter) can be used as the material absorbing light. The ND filter means a filter having a neutral optical density and is a filter that can evenly absorb (absorbance is greater than or equal to 50% and less than or equal to 99.999%; transmittance is greater than or equal to 0.001% and less than or equal to 50%) light without affecting a wavelength in a wavelength range used for exposure.

The light blocking portion 64 has a wall surface that is perpendicular to the incidence surface 62a and the exit surface 62b. The light transmitting portion 65 is configured with a material (for example, glass or transparent silicone rubber) having a light transmitting property and constitutes an optical path that is perpendicular to the incidence surface 62a and the exit surface 62b of the louver member 62.

The protective film 66 is a member (protective member) that protects the louver member 62. The protective member is configured with a material (for example, acrylic resin, polycarbonate, or vinyl chloride resin) having a light transmitting property.

While glass as a protective member is generally comprised on a displaying surface of a flat panel display such as a liquid crystal display, a protective member having a small thickness is preferably used in a displaying device used in the exposure display 56 in order to decrease a distance from each pixel to the exposure surface 110a of the instant film 110.

The protective member may not be necessary but is preferably comprised in order to protect the louver member 62 that is the light exit direction restriction member.

A thickness of the protective member is preferably greater than or equal to 0.1 µm and less than or equal to 500 µm. In a case where the thickness of the protective member is greater than or equal to 0.1 µm, not only an effect of protecting the light exit direction restriction member but also an effect of preventing moire from standing out is achieved. In addition, an effect of preventing a defect of an image caused based on a defect or a structure of the light exit direction restriction member from standing out is achieved. In a case where the thickness of the protective member is less than or equal to 500 µm, blurriness of a recording image can be prevented.

The louver member 62 having the above configuration selectively allows transmission of only light that is incident approximately perpendicularly to the incidence surface 62a. In the exposure display 56, since the louver member 62 is comprised on the displaying surface 56a, a light exit direction of light from each pixel Pix is restricted to a direction that is approximately perpendicular to the displaying surface 56a. Accordingly, the exposure surface 110a of the instant film 110 can be approximately perpendicularly irradiated with light of each pixel Pix, and blurring of the image to be recorded can be suppressed. That is, blurriness of the image to be recorded can be prevented.

The louver member 62 is spaced from the exposure surface 110a of the instant film 110. This spacing permits diffusion of light exiting from the exit surface 62b. This diffusion of light suppresses formation of a non-exposed region on the exposure surface 110a of the instant film 110 due to the light blocking portion 64 (light blocking portion 64 casting a shadow). In FIG. 12, the louver member 62 and the exposure surface 110a of the instant film 110 are spaced by the protective film 66. However, regardless of presence or absence of the protective film 66, the louver member 62 and the exposure surface 110a of the instant film 110 are only required to be fixed at spaced positions.

A thickness of the louver member 62 is preferably greater than or equal to 1.5 mm and less than or equal to 4.0 mm. The thickness is more preferably greater than or equal to 2.0 mm and less than or equal to 4.0 mm and still more preferably greater than or equal to 2.5 mm and less than or equal to 4.0 mm. The light exit direction can be more effectively restricted by increasing the thickness of the louver member 62. Meanwhile, in a case where the thickness of the louver member 62 is increased, the recording image is likely to be blurred. Accordingly, the louver member 62 is preferably configured within the above range of thickness.

A pitch (louver pitch) of the light blocking portion 64 is preferably less than or equal to 80 µm and more preferably less than or equal to 65 µm. As illustrated in the enlarged view of FIG. 13, the pitch (louver pitch) is a distance between adjacent light blocking portions 64. By setting the pitch within the above range, light from each pixel Pix of the exposure display 56 in an inclined direction can be appropriately blocked, and a high quality image can be recorded on the instant film.

FIG. 14 illustrates another configuration of the light exit direction restriction member. The light exit direction restriction member has a structure in which a first louver member 150 and a second louver member 170 are stacked. Reference sign 14A denotes a flat surface of the first louver member 150. Reference sign 14B denotes a flat surface of the second louver member 170.

As illustrated in the flat surface 14A, in the first louver member 150, a plurality of first light blocking portions 152 and a plurality of first light transmitting portions 154 extending in the x direction (first direction) are alternately arranged in the y direction (second direction). A pitch (louver pitch) of the first louver member 150 is preferably less than or equal to 80 µm. Here, the x direction (first direction) is defined as a direction in which the first louver member 150 extends.

As illustrated in the flat surface 14B, in the second louver member 170, a plurality of second light blocking portions 172 and a plurality of second light transmitting portions 174 extending in the y direction (second direction) are alternately arranged in the x direction (first direction). A pitch (louver pitch) of the second louver member 170 is preferably less than or equal to 80 µm. Here, the y direction (second direction) is defined as a direction in which the second louver member 170 extends.

As indicated by reference sign 14C, a stack 140 of the first louver member 150 and the second louver member 170 constitutes the light exit direction restriction member. A thickness t of the stack 140 is preferably greater than or equal to 1.5 mm and less than or equal to 4.0 mm. The thickness is more preferably greater than or equal to 2.0 mm and less than or equal to 4.0 mm and still more preferably greater than or equal to 2.5 mm and less than or equal to 4.0 mm. In a case where the stack is configured with a plurality of louver members, the thickness is a total thickness of the louver members, that is, a thickness of the stack.

The first louver member 150 is arranged in contact with the second louver member 170, and the second louver member 170 is arranged to be spaced from the exposure surface 110a (not illustrated) of the instant film 110.

In FIG. 14, the direction in which the first louver member 150 extends is the x direction (first direction), and the direction in which the second louver member 170 extends is the y direction (second direction). Alternatively, the direction in which the first louver member 150 extends can be the y direction (second direction), and the direction in which the second louver member 170 extends can be the x direction (first direction).

Figure 15:
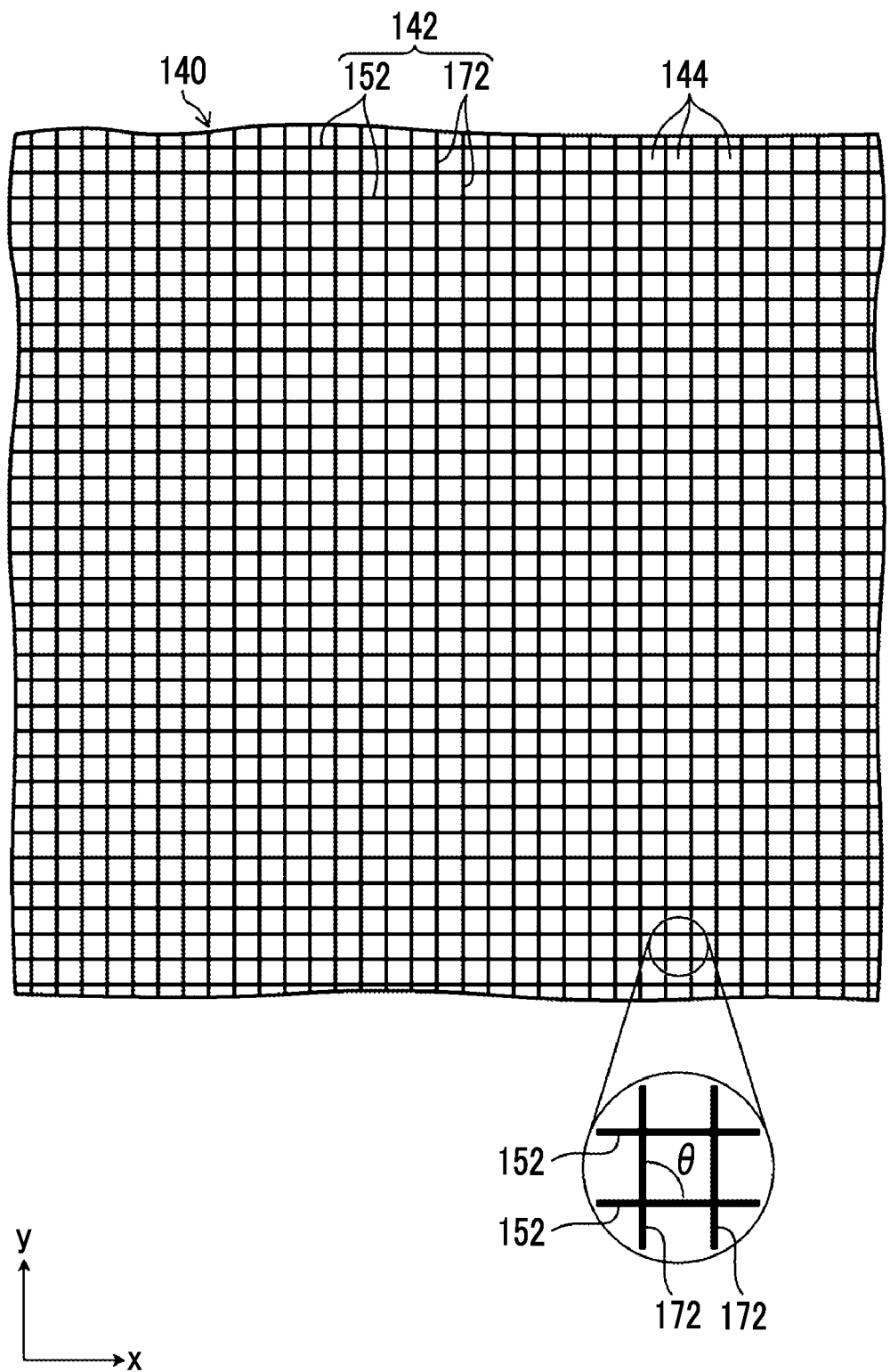
FIG. 15 is a front view of the stack of the louver members.

FIG. 15 is a front view of the stack 140 seen from the first louver member. A light blocking portion 142 of the stack 140 is configured with the plurality of first light blocking portions 152 and the plurality of second light blocking portions 172 by stacking the first louver member 150 and the second louver member 170. A region surrounded by the light blocking portion 142 is a light transmitting portion 144 of the stack 140.

As illustrated in the enlarged view, an angle θ at which the direction in which the first louver member 150 extends intersects with the direction in which the second louver member 170 extends is 90 degrees.

Figure 16:
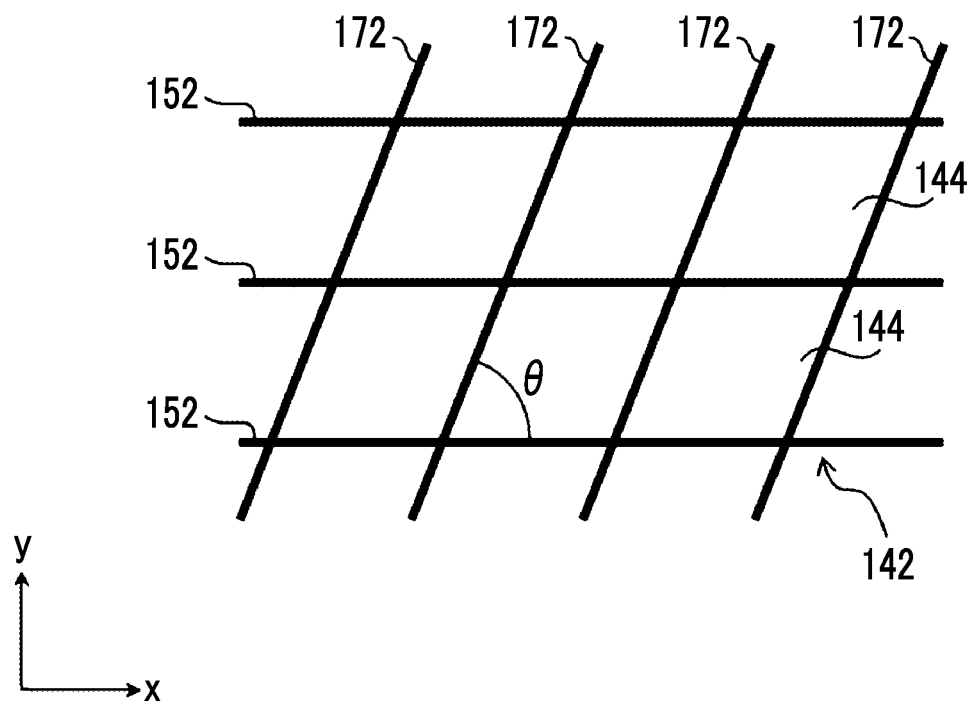
FIG. 16 is an enlarged front view of a part of another stack of the louver members.

FIG. 16 is a partial enlarged view illustrating another form of the stack. As illustrated in FIG. 16, in the stack 140, the light blocking portion 142 of the stack 140 is configured with the plurality of first light blocking portions 152 of the first louver member 150 (not illustrated) and the plurality of second light blocking portions 172 of the second louver member 170 (not illustrated). A region surrounded by the light blocking portion 142 is a light transmitting portion 144 of the stack 140.

In FIG. 16, the angle θ at which the direction (x direction (first direction)) in which the first louver member 150 extends intersects with the direction (y direction (second direction)) in which the second louver member 170 extends is less than 90°. The angle θ of intersection is preferably greater than or equal to 70 degrees and less than or equal to 90 degrees. Using this range can suppress moire.

A difference in angle can also be present between a direction in which the louver member 62 or the stack 140 extends, and the x direction and the y direction that are arrangement standards in a case of two-dimensionally arranging the pixels of the exposure display 56. The difference in angle can effectively suppress occurrence of moire. For example, in a case of the stack 140, an angle formed between the direction in which the first louver member 150 extends, and the x direction as the arrangement standard of the pixels is preferably greater than 0 degrees and less than 90 degrees, more preferably greater than or equal to 1 degree and less than or equal to 89 degrees, still more preferably greater than or equal to 10 degrees and less than or equal to 80 degrees, and further more preferably greater than or equal to 20 degrees and less than or equal to 70 degrees.

<Image Displaying Display>

The image displaying display 16 is a display that displays the image to an outside, and is configured with a touch panel display. As illustrated in FIG. 10, the image displaying display 16 comprises an image displaying liquid crystal display 68, an image displaying backlight 70, and a touch sensor 72. The image displaying liquid crystal display 68 is configured with a transmissive color liquid crystal display. The image displaying backlight 70 evenly irradiates an entire surface of a display region of the image displaying liquid crystal display 68 with light from a rear of the image displaying liquid crystal display 68. The image displaying backlight 70 comprises a rod-shaped lamp 70a that is a white light source, and a light guide plate 70b that evenly guides light exiting from the rod-shaped lamp 70a to the entire surface of the display region of the image displaying liquid crystal display 68. The touch sensor 72 is comprised on a displaying surface 16a of the image displaying display 16. The touch sensor 72 is one example of a touch operation detection unit. The touch sensor 72 detects a touch operation performed on the displaying surface 16a of the image displaying display 16.

As illustrated in FIG. 6 and FIG. 10, the image displaying display 16 is arranged to be stacked on the exposure display 56. A light blocking wall 74 is comprised between the image displaying display 16 and the exposure display 56. The light blocking wall 74 is one example of a light blocking member and prevents light of the backlight of one from leaking to the display region of the other. Accordingly, exposure of the instant film 110 due to light of the image displaying backlight 70 leaking to an exposure display 56 side can be prevented.

The number of pixels of the exposure display 56 can be different from the number of pixels of the image displaying display 16. For example, the number of pixels of the exposure display 56 is preferably larger than the number of pixels of the image displaying display 16. The exposure display 56 having a larger number of pixels enables a high quality image to be printed on the instant film 110.

Brightness of the exposure display 56 can be different from brightness of the image displaying display 16. For example, the brightness of the exposure display 56 is preferably higher than the brightness of the image displaying display 16. Light from the exposure display 56 is attenuated by the louver member 62. Increasing the brightness of the exposure display 56 can resolve insufficient exposure of the instant film 110.

[Electric Configuration]

Figure 17:
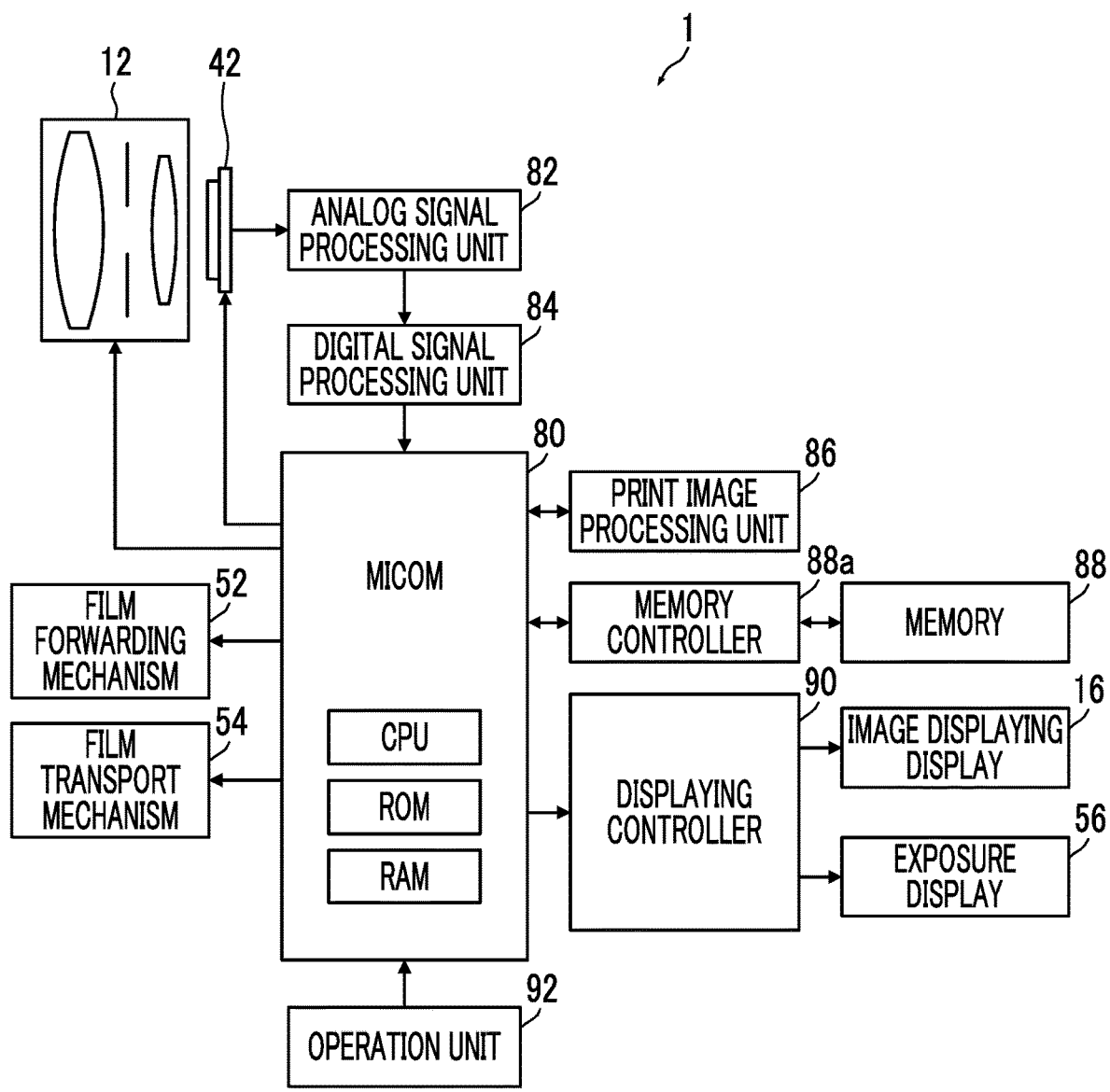
FIG. 17 is a block diagram illustrating an electric configuration of a printer-equipped digital camera.

FIG. 17 is a block diagram illustrating an electric configuration of the printer-equipped digital camera.

As illustrated in the drawing, the printer-equipped camera 1 comprises a microcomputer (microcontroller) 80 comprising a central processing unit (CPU), a read only memory (ROM), and a random access memory (RAM). Driving of each unit is controlled by the microcomputer 80. That is, the microcomputer 80 controls driving of the imaging lens 12, the image sensor 42, the film forwarding mechanism 52, the film transport mechanism 54, and the like. The microcomputer 80 controls each unit based on an operation input from an operation unit 92. The operation unit 92 is configured with the power button 18 and the touch sensor 72. The microcomputer 80 implements various control functions by executing a predetermined control program.

The printer-equipped camera 1 comprises an analog signal processing unit 82, a digital signal processing unit 84, a print image processing unit 86, a memory 88, a memory controller 88a, and a displaying controller 90.

The analog signal processing unit 82 fetches an analog image signal of each pixel output from the image sensor 42 and performs a predetermined type of signal processing (for example, correlative double sampling processing or amplification processing) on the analog signal. The analog signal processing unit 82 includes an analog to digital converter/ AD converter (ADC), and transforms the analog image signal after the predetermined type of signal processing into a digital image signal and outputs the digital image signal.

The digital signal processing unit 84 fetches the digital image signal output from the analog signal processing unit 82 and generates image data by performing a predetermined type of signal processing (for example, gradation transformation processing, white balance correction processing, gamma-correction processing, demosaicing, or YC transformation processing) on the digital image signal. The generated image data is output to the microcomputer 80.

The print image processing unit 86 generates print image data by performing a predetermined type of image processing on the image data to be printed, under control of the microcomputer 80. That is, image data to be displayed on the exposure display 56 is generated. This image data is image data that is optimized for exposure of the instant film 110. Consequently, the displaying controller 90 can display, on the exposure display 56, an image different from the image displayed on the image displaying display 16.

In the printer-equipped camera 1 of the present embodiment, since the instant film 110 of the mono-sheet type is used, left-right inversion processing of the image is performed as a part of image processing. In addition, since the instant film 110 is loaded upside down (a top and a bottom are reversed) in the printer-equipped camera 1, up-down inversion processing is performed.

Figure 18:
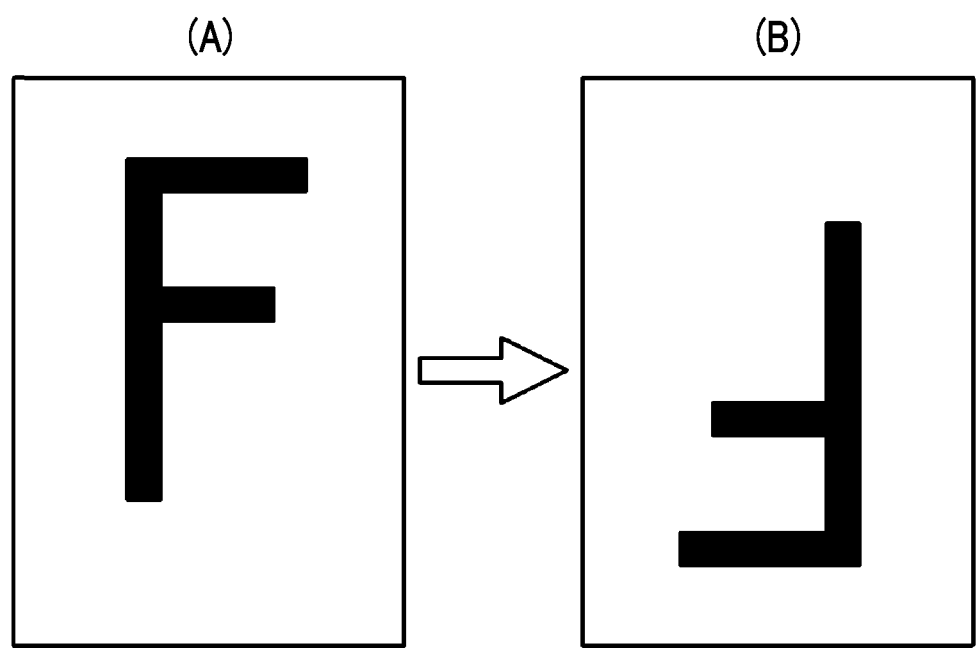
FIG. 18 is a conceptual diagram of generation of a print image.

FIG. 18 is a conceptual diagram of generation of the print image.

In the drawing, (A) is an image represented by image data of a print target, and (B) is an image represented by the print image data. As illustrated in the drawing, the print image is an up-down and left-right inverted image of the original image.

The memory 88 stores various types of data including the image data. The memory 88 is configured with a non-volatile memory such as an electrically erasable programmable read only memory (EEPROM). The memory controller 88a reads and writes data in the memory 88 under control of the microcomputer 80.

The displaying controller 90 displays the images on the image displaying display 16 and the exposure display 56 under control of the microcomputer 80. For example, the displaying controller 90 is configured with large scale integration (LSI).

Figure 19:
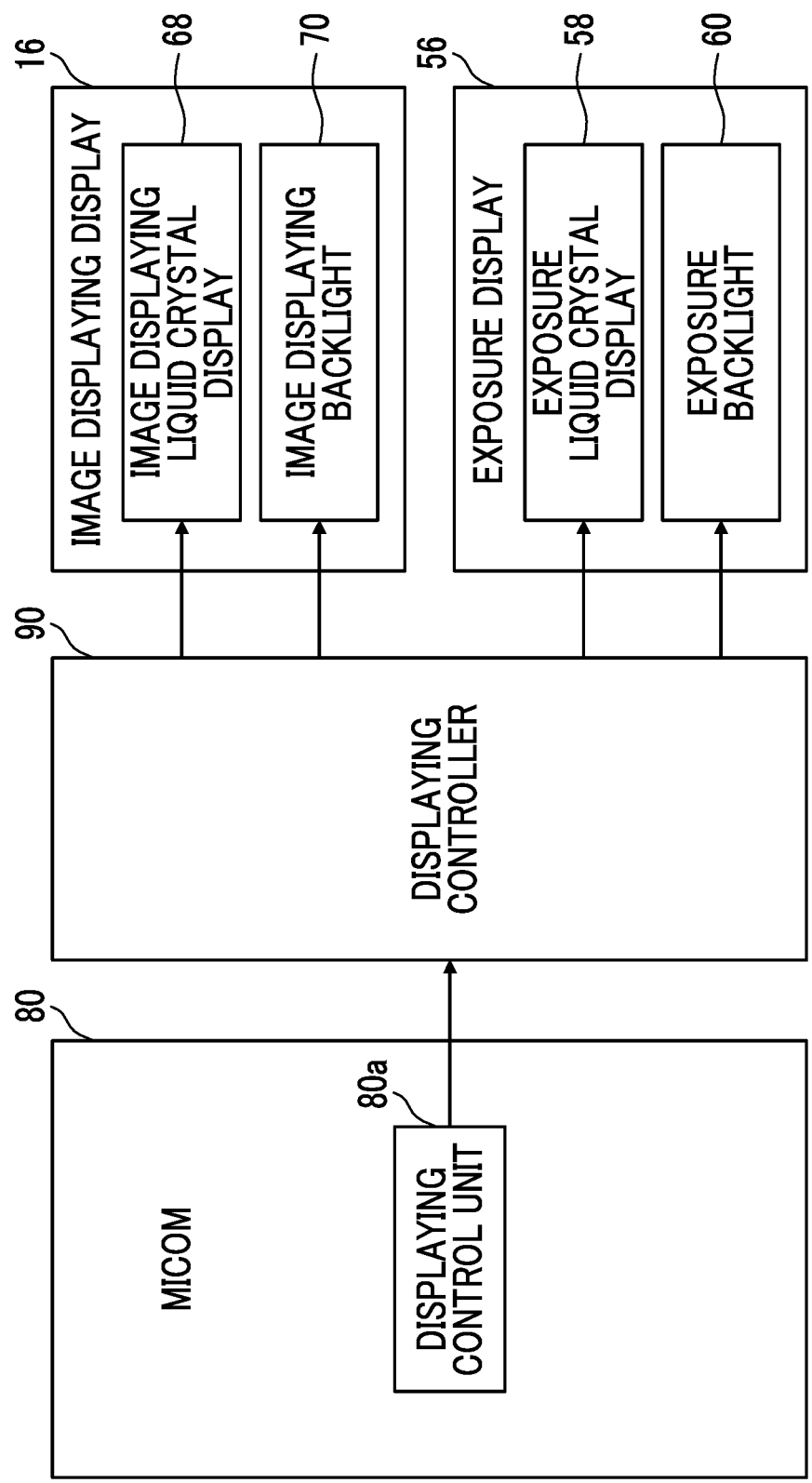
FIG. 19 is a block diagram of functions of a displaying controller.

FIG. 19 is a block diagram of functions of the displaying controller.

In a case of displaying the image on the image displaying display 16, the displaying controller 90 outputs displaying data to the image displaying liquid crystal display 68 and turns ON the image displaying backlight 70. In a case of displaying the image on the exposure display 56, the displaying controller 90 outputs the displaying data to the exposure liquid crystal display 58 and turns ON the exposure backlight 60.

The microcomputer 80 functions as a displaying control unit 80a by executing a predetermined displaying control program and controls displaying of the image displaying display 16 and the exposure display 56 through the displaying controller 90.

In a case where a mode of the printer-equipped camera 1 is set to an imaging mode, the displaying control unit 80a displays an image captured by the image sensor 42 on the image displaying display 16 in real time. That is, a live view image is displayed on the image displaying display 16. In addition, an operation button (shutter button or the like) necessary for imaging is displayed on the image displaying display 16. Furthermore, as necessary, information (an F number, a shutter speed, the number of imageable sheets, or the like) related to imaging is displayed on the image displaying display 16.

In a case where the mode of the printer-equipped camera 1 is set to a playback mode, the displaying control unit 80a displays, on the image displaying display 16, image data that is recorded in the memory 88 functioning as an image storage unit.

Furthermore, the displaying control unit 80a displays a setting screen for performing various types of setting on the image displaying display 16 in accordance with a call for the setting screen.

In a case of printing the image, the print image is displayed on the exposure display 56. The displaying control unit 80a switches OFF displaying of the image displaying display 16.

[Effect of Printer-Equipped Digital Camera]

<Imaging>

In a case where the printer-equipped camera 1 is powered ON, the printer-equipped camera 1 is started in the imaging mode. In the imaging mode, the image captured by the image sensor 42 is displayed on the image displaying display 16 in real time. That is, the live view image is displayed on the image displaying display 16. A user checks adjustment of composition, a state of focusing on a main subject, and the like using the image displaying display 16 as a finder.

Figure 20:
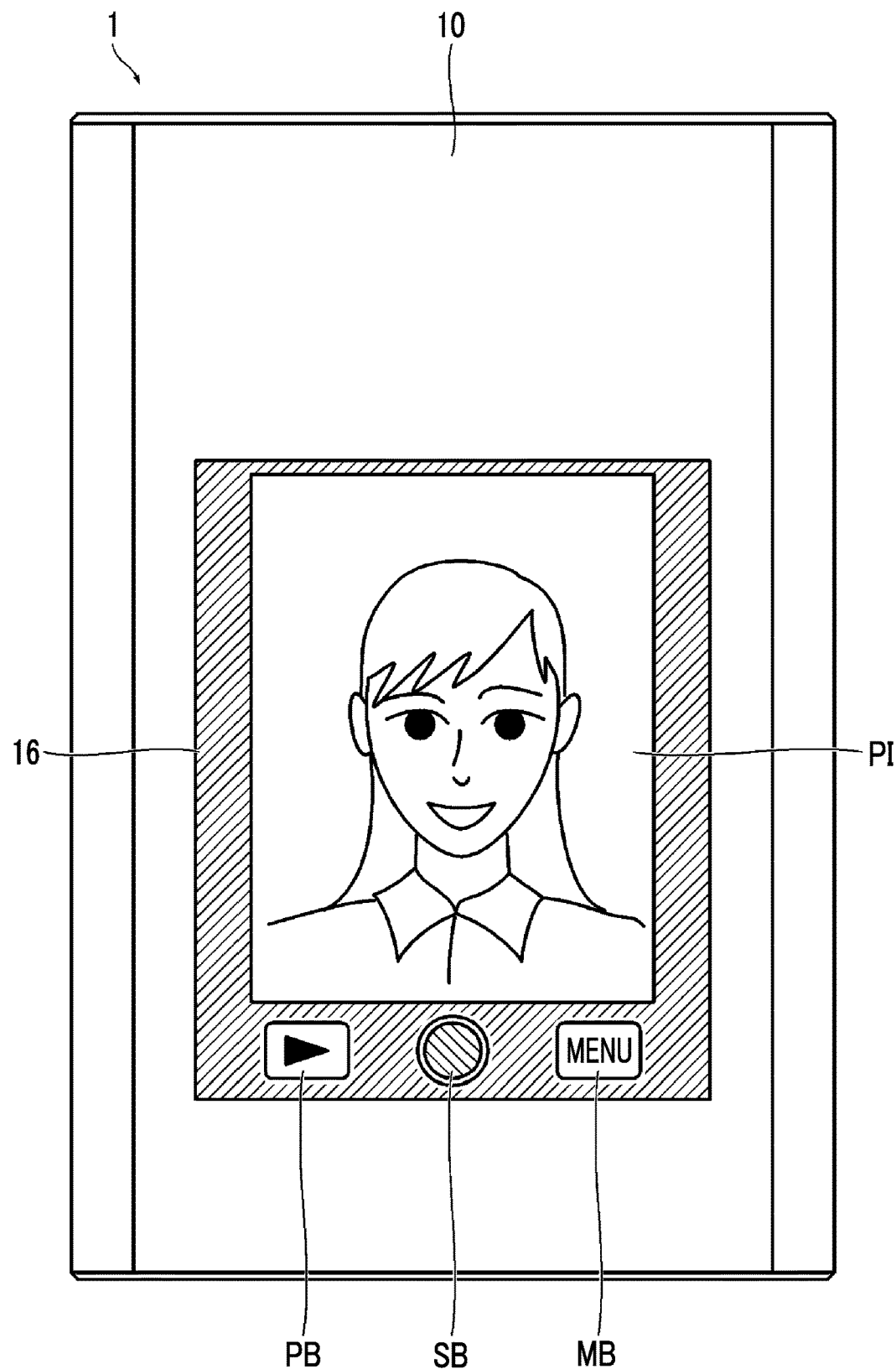
FIG. 20 is a diagram illustrating one example of displaying of an image displaying display in an imaging mode.

FIG. 20 is a diagram illustrating one example of displaying of the image displaying display in the imaging mode.

As illustrated in the drawing, the image displaying display 16 displays a live view image LI and various operation buttons. In the example illustrated in FIG. 20, a case where a shutter button SB, a playback button PB, and a menu button MB are displayed as the operation buttons is illustrated. The shutter button SB is a button for providing an instruction to record (capture) the image. The playback button PB is a button for providing an instruction to switch to the playback mode and constitutes a mode switching unit. The menu button MB is a button for providing an instruction to display a menu screen.

The user provides the instruction to record the image by touching the shutter button SB. In a case where the instruction to record the image is provided, recording image data is fetched from the image sensor 42, subjected to a necessary type of signal processing, and recorded in the memory 88. The microcomputer 80 permits the user to perform imaging even before the instant film pack 100 is loaded in the film loading chamber 50, or even in a case where the instant film 110 before exposure is not present in the instant film pack 100. Even in a case where the instant film 110 that can be printed is not present, the recording image data is fetched from the image sensor 42, subjected to the necessary type of signal processing, and recorded in the memory 88 by the instruction from the user.

<Playback>

In a case where the playback button PB displayed on the image displaying display 16 is touched in a state of the imaging mode, the mode of the printer-equipped camera 1 is switched to the playback mode.

In a case where switching is performed to the playback mode, image data of an image that is captured last (image that is recorded last in the memory 88) is read out from the memory 88 and displayed on the image displaying display 16.

Figure 21:
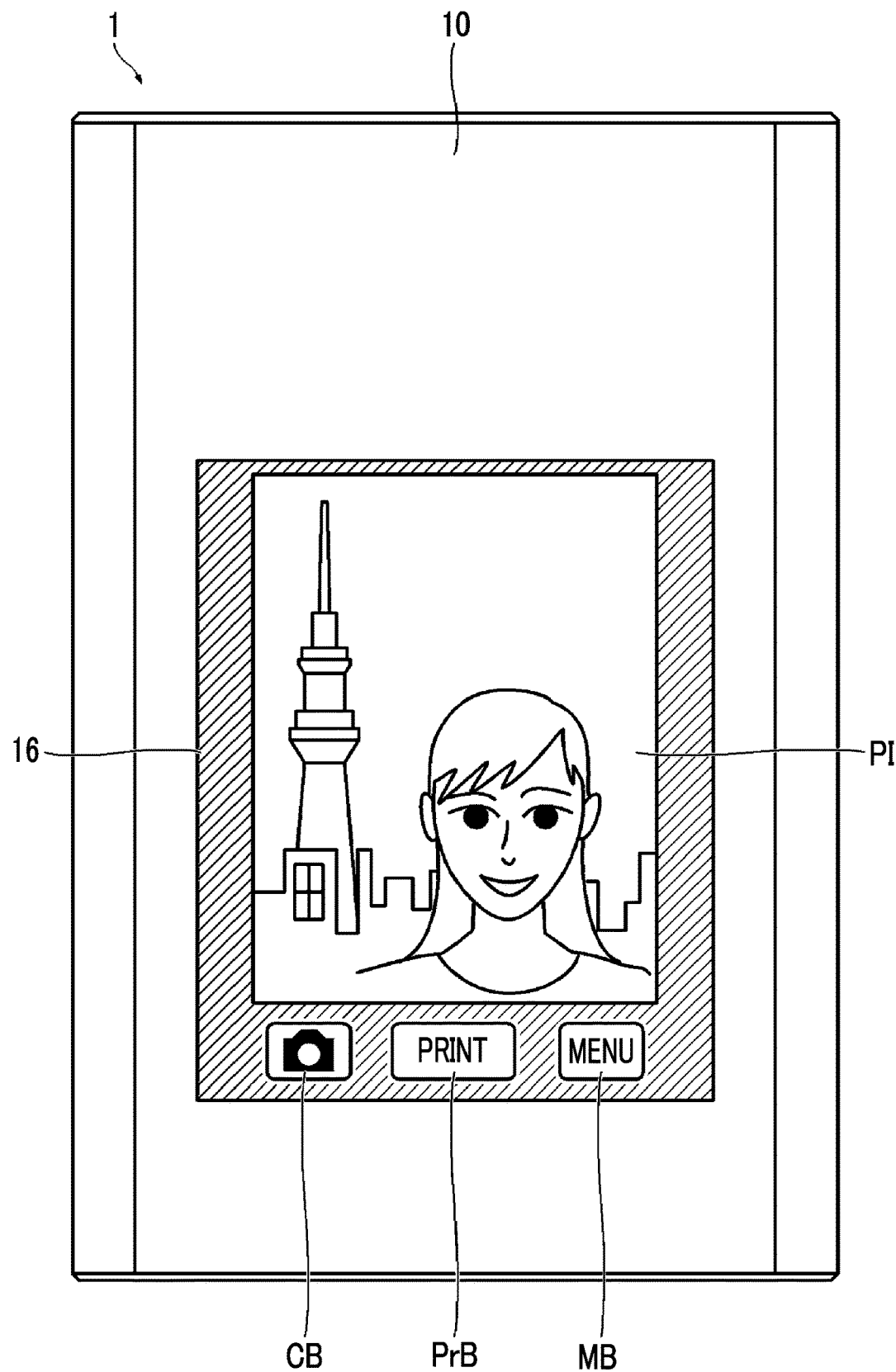
FIG. 21 is a diagram illustrating one example of displaying of the image displaying display in a playback mode.

FIG. 21 is a diagram illustrating one example of displaying of the image displaying display in the playback mode.

As illustrated in the drawing, the image displaying display 16 displays a playback image PI and various operation buttons. In the example illustrated in FIG. 21, a case where a print button PrB, a camera button CB, and the menu button MB are displayed as the operation buttons is illustrated. The print button PrB is a button for providing a print instruction for the displayed image and constitutes a print instruction unit. The camera button CB is a button for providing an instruction to switch to the imaging mode and constitutes the mode switching unit. The menu button MB is a button for providing an instruction to display a menu screen.

In a case of printing the displayed image, the user touches the print button PrB. In a case of forwarding a frame, a flick operation is performed on a screen of the image displaying display 16. The flick operation is an operation of swiping the screen with a fingertip. In a case of enlarging the displayed image, a pinch-out operation is performed on the screen of the image displaying display 16. The pinch-out operation is an operation of increasing an interval between fingers while two fingers are in contact with the screen. In a case of reducing the displayed image, a pinch-in operation is performed on the screen of the image displaying display 16. The pinch-in operation is an operation of decreasing an interval between fingers while two fingers are in contact with the screen.

<Print>

As described above, in a case where the print button PrB is touched during playback of the image in the playback mode, the displayed image is printed. In addition, in a case where an auto print mode is selected in the imaging mode, the captured image is printed without waiting for a print instruction. For example, setting ON and OFF of the auto print mode is performed by calling a setting screen for the mode from the menu screen.

In a case where the print instruction is provided, the image data of the print target displayed on the image displaying display 16 is provided to the print image processing unit 86, and the print image data is generated. The microcomputer 80 displays the generated print image data on the exposure display 56 by providing the print image data to the displaying controller 90. Accordingly, the print image is displayed on the exposure display 56.

The instant film 110 is exposed by displaying the image on the exposure display 56. The instant film 110 is exposed by irradiating the instant film 110 with light from each pixel of the exposure display 56 through the louver member 62. The louver member 62 has an effect of allowing transmission of only light that is approximately perpendicular to the exposure surface 110a. By this displaying control method, blurriness of the image can be prevented, and a high quality image can be printed.

The image is displayed at constant brightness for a constant time period. An exposure time period is set based on the brightness of the exposure display 56. That is, the exposure time period is set to a time period in which the instant film 110 can be appropriately exposed.

In a case where a constant time period elapses from a start of displaying, displaying of the exposure display 56 is switched OFF, and the exposure is finished. In a case where the exposure is finished, the film forwarding mechanism 52 and the film transport mechanism 54 are driven. By driving the film forwarding mechanism 52, the exposed instant film 110 is discharged from the case 120 by the claw 52a. The instant film 110 discharged from the case 120 is discharged from the film discharge port 20 by the spreading roller pair 54a. In addition, the developing treatment is performed during discharging. That is, the developing treatment liquid in the pod portion is subjected to the spreading processing by crushing the pod portion 114 by the spreading roller pair 54a, and the developing treatment is performed.

Figure 22:
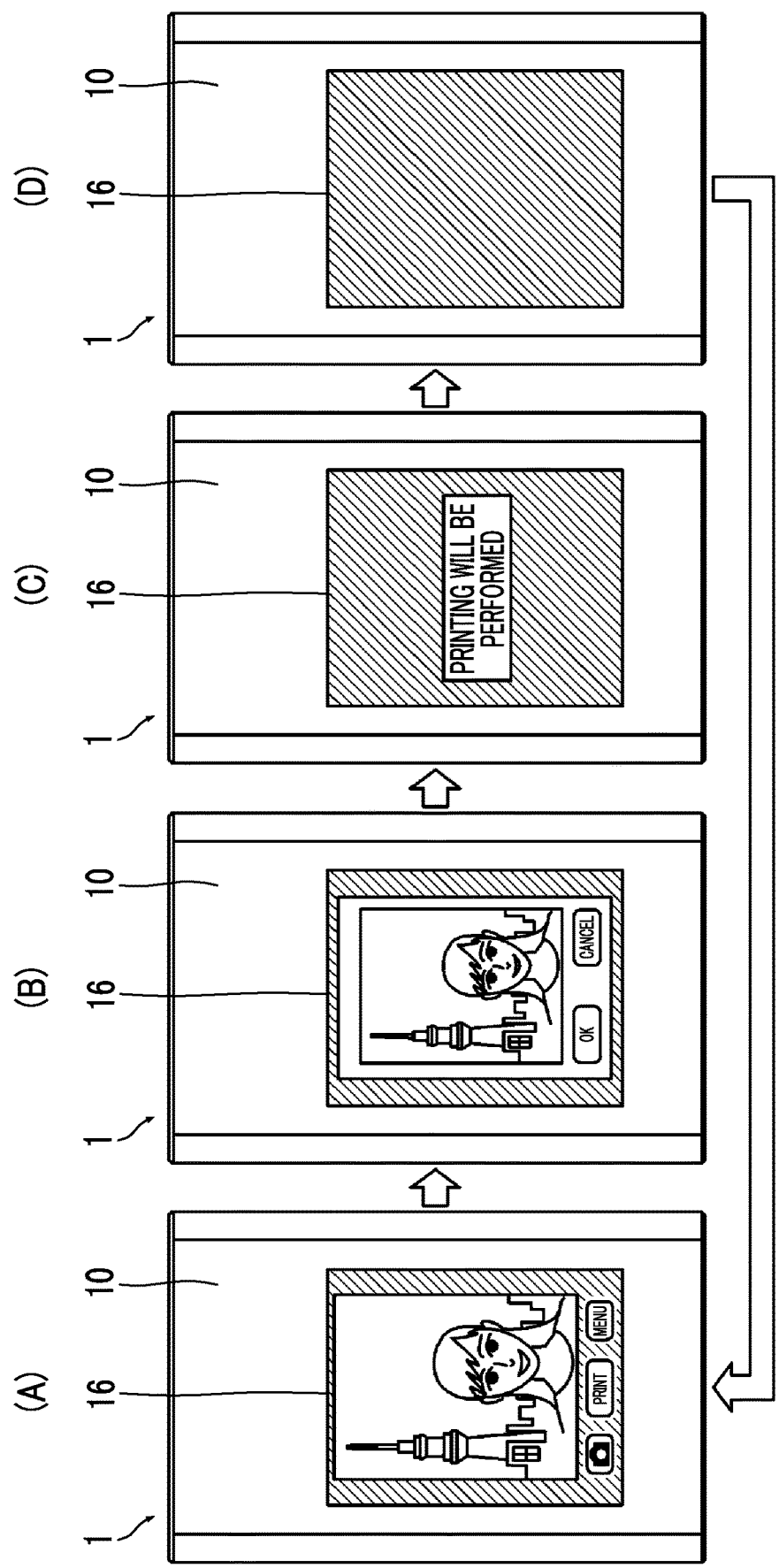
FIG. 22 is a diagram illustrating a transition state of screen displaying of the image displaying display in a case of printing in the playback mode.

FIG. 22 is a diagram illustrating a transition state of screen displaying of the image displaying display in a case of printing in the playback mode.

FIG. 22(A) illustrates a playback state of the image. In this state, in a case where the print instruction for the image in playback is provided by touching the print button, a print checking screen is displayed as illustrated in FIG. 22(B). In the print checking screen, an image of a print is displayed on the image displaying display 16. That is, an image (image in a form of fitting an image of the print target in the observation region 118 of the observation surface 110b of the instant film 110) in a case where the image is printed on the instant film 110 is displayed. At the same time, an "OK" button for providing an instruction to execute printing and a "CANCEL" button for providing an instruction to stop printing are displayed. The user touches the "OK" button in a case of executing printing, and touches the "CANCEL" button in a case of stopping printing. In a case where the "CANCEL" button is touched, a return is made to a playback screen illustrated in FIG. 22(A). In a case where the "OK" button is touched, a screen for notifying execution of printing is displayed as illustrated in FIG. 22(C). In this screen, a message "printing will be performed" is displayed. Then, printing is executed. That is, a recording image is displayed on the exposure display 56, and the instant film 110 is exposed. During the exposure, displaying of the image displaying display 16 is switched OFF as illustrated in FIG. 22(D). In a case where the exposure is finished, a return is made to the playback screen of the printed image as illustrated in FIG. 22(A).

[Displaying Control of Image Displaying Display and Exposure Display]

As described above, in the printer-equipped camera 1 of the present embodiment, displaying of the image displaying display 16 is switched OFF during the exposure. Accordingly, a peak value of power can be reduced, and a power load can be reduced. In addition, size reduction of a battery and also size reduction of the entire camera are achieved.

Figure 23:
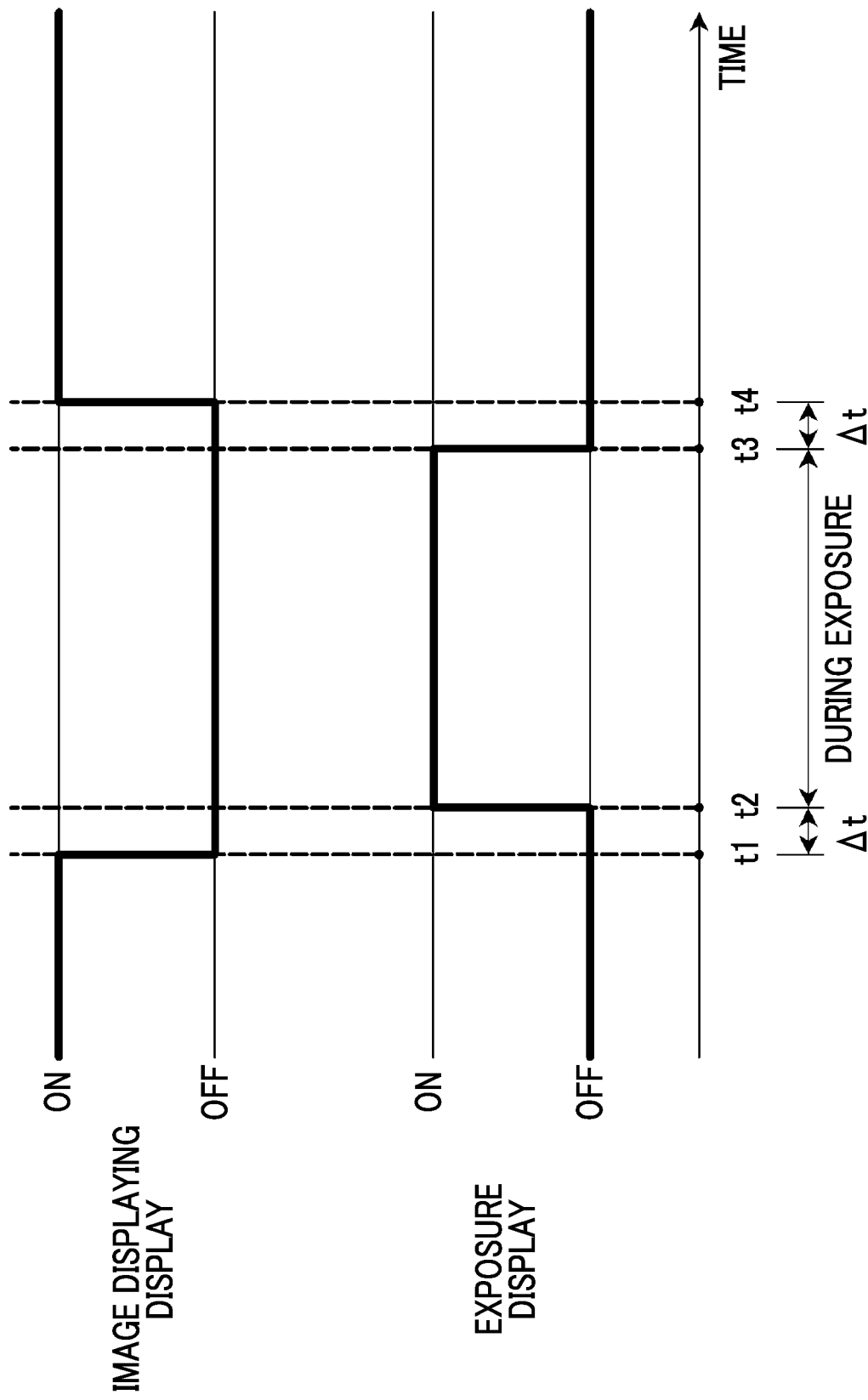
FIG. 23 is a timing chart of a displaying control of the image displaying display and the exposure display.

FIG. 23 is a timing chart of a displaying control of the image displaying display and the exposure display.

The drawing illustrates a form of displaying control in a case where the exposure starts at time t2 and the exposure is finished at time t3. As illustrated in the drawing, while the instant film 110 is exposed by displaying the image on the exposure display 56, displaying of the image displaying display 16 is switched OFF.

Displaying of the image displaying display 16 is switched OFF earlier than the start of the exposure by a constant time period. In other words, in a case of exposing the instant film, the exposure is started after an elapse of a constant time period (after an elapse of Δt) after displaying of the image displaying display 16 is switched OFF.

During the exposure, displaying of the image displaying display 16 is continuously switched OFF. In a case where the exposure is finished, displaying is switched ON after the elapse of the constant time period (after the elapse of Δt). That is, displaying of the exposure display 56 is switched OFF, and displaying is switched ON after the elapse of the constant time period from switching OFF.

During displaying of the exposure display 56, displaying of the image displaying display 16 is always switched OFF. Accordingly, a peak value of power can be reduced, and a power load can be reduced.

Modification Example

<Processing in Imaging Mode>

In a case of printing in the imaging mode, driving of the imaging unit is preferably switched OFF during the exposure. More specifically, during displaying of the image on the exposure display 56, driving of the imaging lens 12 and the image sensor 42 is switched OFF. Accordingly, the peak value of power can be more effectively reduced. In this case, the microcomputer 80 functions as an imaging control unit and controls driving of the imaging lens 12 and the image sensor 42.

Modification Example 1 of Displaying Control of
Image Displaying Display and Exposure Display Controlling ON and OFF of displaying of the image displaying display 16 and the exposure display 56 may be performed by controlling ON and OFF of the backlight.

The backlight consumes more power than driving of the liquid crystal display. Thus, the power load can be sufficiently reduced by controlling ON and OFF of displaying by controlling ON and OFF of the backlight. In addition, the control can be simplified.

Modification Example 2 of Displaying Control of
Image Displaying Display and Exposure Display In a case of controlling ON and OFF of displaying of the image displaying display 16 and the exposure display 56 by controlling ON and OFF of the backlight, the same image may be displayed on the image displaying display 16 and the exposure display 56. That is, the same image may be displayed on each liquid crystal display by outputting the same displaying data from the displaying controller 90. Accordingly, the displaying control can be simplified.

In a case of the present example, during the exposure, the image displaying liquid crystal display 68 displays the image during the exposure (image to be recorded on the instant film 110). However, since the image displaying backlight 70 is switched OFF, the image cannot be visually recognized. Similarly, while the live view image is displayed on the exposure liquid crystal display 58 during imaging, the instant film 110 is not exposed since the exposure backlight 60 is switched OFF.

Modification Example 3 of Displaying Control of Image Displaying Display and Exposure Display In a case of displaying the same image on the image displaying display 16 and the exposure display 56, the image displaying display 16 and the exposure display 56 may be configured to be connected to the same image output interface.

Figure 24:
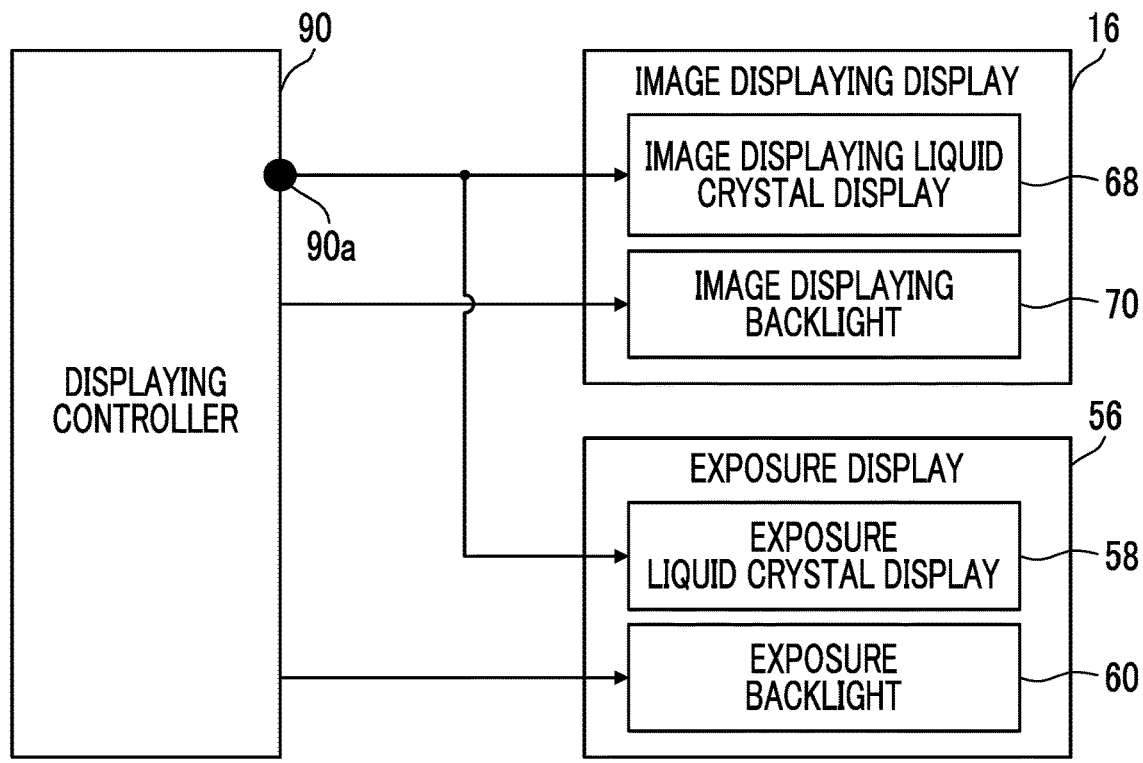
FIG. 24 is a conceptual diagram of a case where the image displaying display and the exposure display are connected to the same image output interface.

FIG. 24 is a conceptual diagram of a case where the image displaying display and the exposure display are connected to the same image output interface.

As illustrated in the drawing, the image displaying display 16 and the exposure display 56 are connected to a same image output interface 90a for the displaying controller 90. More specifically, the image displaying liquid crystal display 68 of the image displaying display 16 and the exposure liquid crystal display 58 of the exposure display 56 are connected to the same image output interface 90a of the displaying controller 90. Accordingly, the same displaying data is provided to the image displaying liquid crystal display 68 and the exposure liquid crystal display 58 from the displaying controller 90, and the same image is displayed.

Sharing an interface for the displaying control between the image displaying display 16 and the exposure display 56 can further simplify a configuration.

Modification Example 4 of Displaying Control of Image Displaying Display and Exposure Display Controlling ON and OFF of displaying of the image displaying display 16 and the exposure display 56 may be performed by switching the backlight to be turned ON using a switch.

Figure 25:
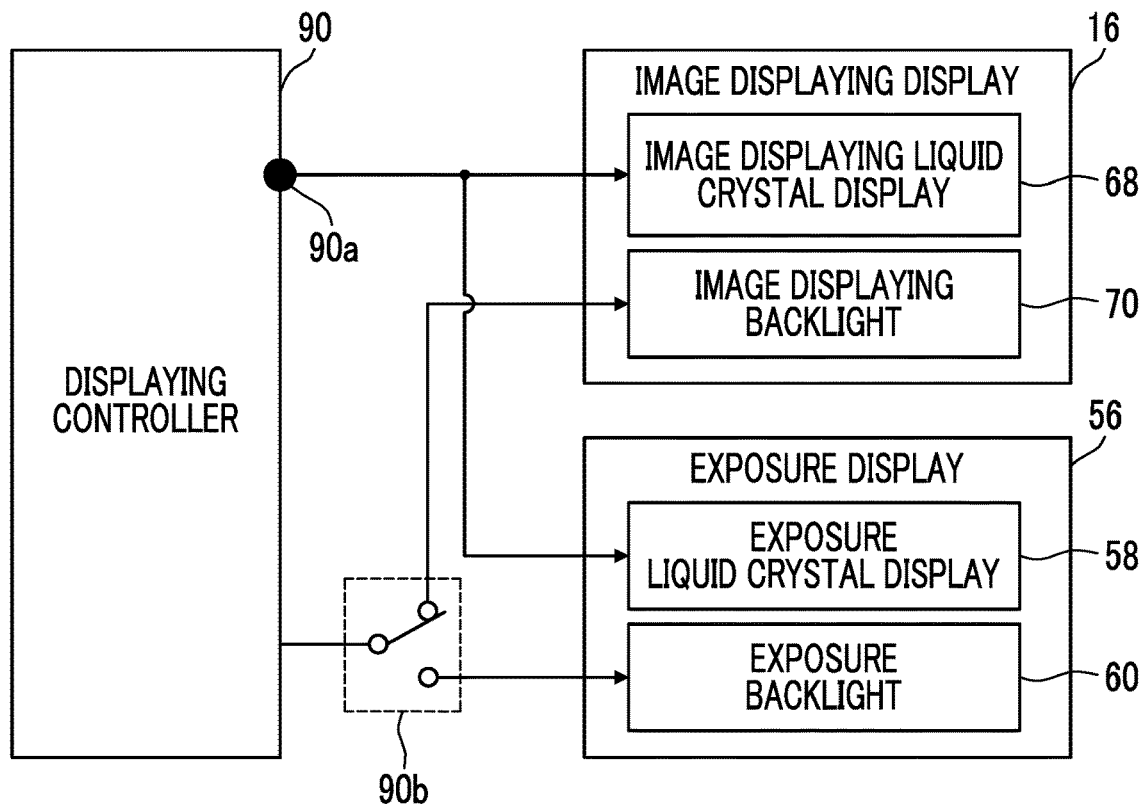
FIG. 25 is a conceptual diagram of a case where controlling ON and OFF of displaying of the image displaying display and the exposure display is performed by switching a backlight to be turned on using a switch.

FIG. 25 is a conceptual diagram of a case where controlling ON and OFF of displaying of the image displaying display and the exposure display is performed by switching the backlight to be turned on using the switch.

As illustrated in the drawing, the image displaying backlight 70 and the exposure backlight 60 are selectively turned on using a switch 90b. Accordingly, any one of the image displaying display 16 and the exposure display 56 can selectively perform displaying.

Modification Example 5 of Displaying Control of Image Displaying Display and Exposure Display As described above, in a case of exposing the instant film 110, the image is displayed on the exposure display 56 at the constant brightness for the constant time period. Accordingly, the brightness of the exposure display 56 is constant.

Meanwhile, it is preferable that the brightness of the image displaying display 16 is freely adjustable by the user. That is, it is preferable to separately dispose a brightness adjustment unit so that the user can adjust the brightness to any brightness. Accordingly, favorable visibility can be secured at all times regardless of a usage environment.

For example, brightness adjustment is performed by preparing a brightness adjustment screen and performing a screen operation. For example, the brightness adjustment screen is configured to be called from the menu screen. Besides, it can be configured that adjustment is performed by disposing a brightness adjustment dial or the like in the camera body 10.

While the constant brightness is set for the exposure display 56, the brightness is set to be higher than the brightness of the image displaying display 16 since the louver member 62 is comprised in the exposure display 56.

Modification Example of Image Displaying Display and Exposure Display

While both of the image displaying display 16 and the exposure display 56 are configured with a liquid crystal display in the embodiment, a displaying device used as the image displaying display 16 and the exposure display 56 is not limited thereto. Besides, for example, a flat panel display such as an organic electro-luminescence display (OLED), a plasma display, a field emission display (FED), or an electronic paper can be used. The image displaying display 16 and the exposure display 56 do not need to be the same displaying device. For example, one can be configured with a liquid crystal display, and the other can be configured with an organic EL display. The image displaying display 16 and the exposure display 56 having different displaying sizes may be used.

In a case where the image displaying display 16 and the exposure display 56 are configured with a liquid crystal display, a backlight having a surface light emitting configuration may be used.

Modification Example of Layout of Image Displaying Display and Exposure Display

While it is configured that the image displaying display 16 and the exposure display 56 are arranged to be stacked back to back in the embodiment, a layout of the image displaying display 16 and the exposure display 56 is not limited thereto. For example, the image displaying display 16 and the exposure display 56 can be configured to be arranged with the film loading chamber 50 interposed therebetween. In this case, in a case where the instant film pack 100 is loaded in the film loading chamber 50, the image displaying display 16 and the exposure display 56 are arranged with the instant film 110 interposed therebetween.

Figure 26:
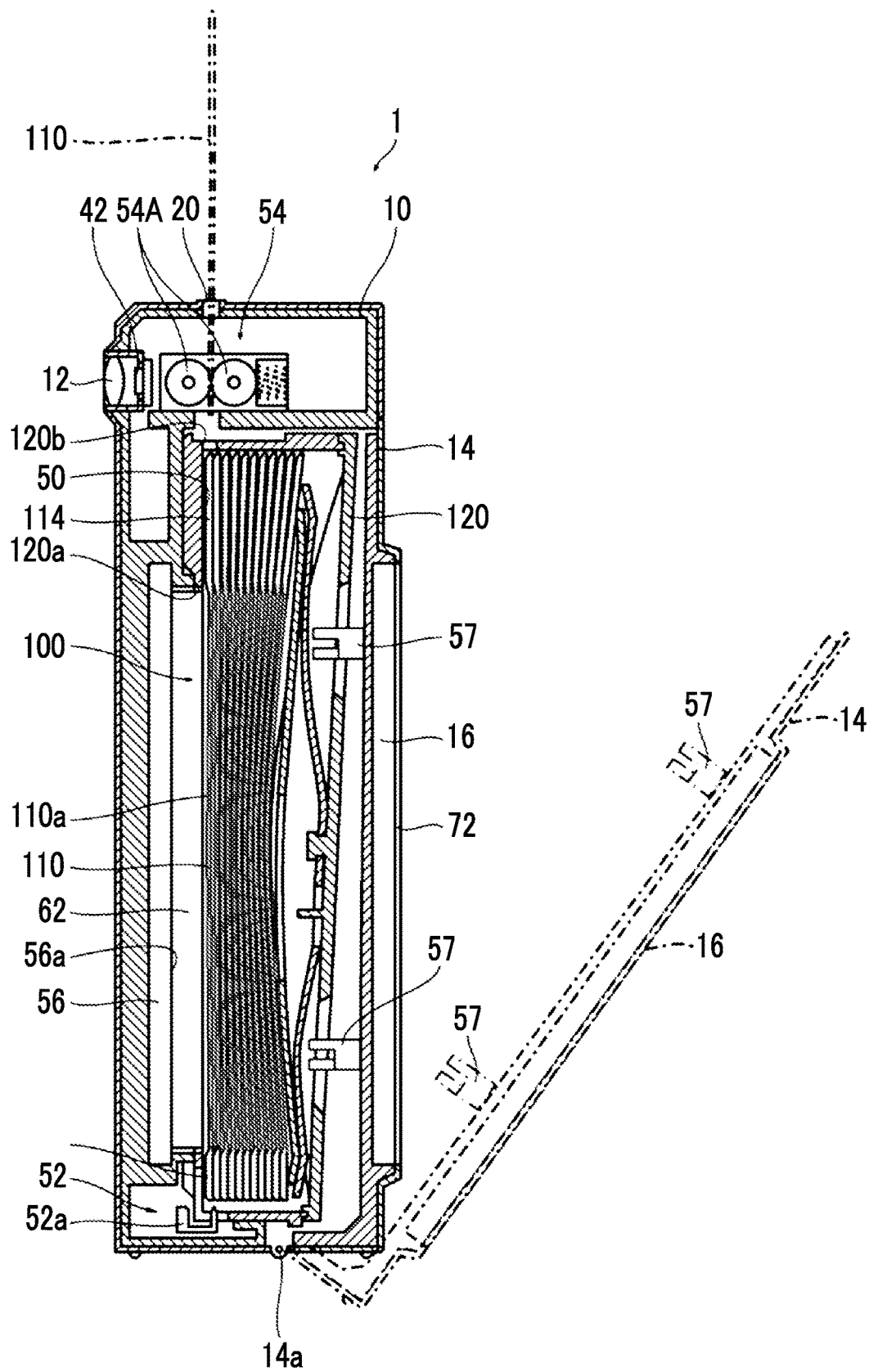
FIG. 26 is a diagram illustrating a schematic configuration of the printer-equipped digital camera in a case where the image displaying display and the exposure display are arranged with the instant film pack interposed therebetween.

FIG. 26 is a diagram illustrating a schematic configuration of the printer-equipped digital camera in a case where the image displaying display and the exposure display are arranged with the instant film pack interposed therebetween.

The drawing illustrates an example of a case where the image displaying display 16 is arranged in the film lid cover 14. By arranging the image displaying display 16 in the film lid cover 14, the image displaying display 16 and the exposure display 56 are arranged with the instant film pack 100 interposed therebetween.

The light blocking wall can be omitted by arranging the image displaying display 16 and the exposure display 56 with the instant film pack 100 interposed therebetween.

Modification Example of Imaging Unit

A plurality of the imaging units may be comprised. For example, the imaging unit may be comprised on each of a front surface and a rear surface of the camera body 10. Alternatively, the imaging unit may be rotatably held in the camera body so that an imaging direction can be adjusted to any direction.

Modification Example of Instant Film

The instant film to be used is not limited to the monosheet type, and an instant film of a peel-apart type or the like may be used.

Modification Example of Light Exit Direction Restriction Member

As the louver member that is the light exit direction restriction member, the light transmitting portion is only required to at least allow passage of light. Accordingly, the light transmitting portion can be configured with a cavity, and the light exit direction restriction member can be configured with only the light blocking portion. The light exit direction restriction member may be a porous plate. In the porous plate, multiple through-holes having a predetermined shape and size are disposed at a predetermined pitch in a rectangular plate having a predetermined thickness in order to restrict exiting of light from the pixels of the exposure display. While a material of a porous plate 2 is not particularly restricted, a metal plate such as an aluminum plate having a predetermined thickness, a resin plate, or a carbon material plate can be used.

Modification Example of Print Image Processing

In order to print a higher quality image, a predetermined type of image processing may be performed on an exposure image, that is, the image displayed on the exposure display, compared to the image displayed on the image displaying display. For example, considering that a difference in density of the recording image is smaller than that of a displaying image, processing of increasing (highlighting) a high-frequency component (edge part) of the displaying image in advance, that is, so-called edge highlighting processing, may be performed. For example, a well-known method such as unsharp mask processing can be employed as the edge highlighting processing.

Specifically, first, an unsharp mask is generated. In generation of the unsharp mask, for example, a two-dimensional Gaussian distribution in which f(x, y) illustrated in Expression (1) below is a filter coefficient and a degree of distribution is a standard deviation σ is applied.

$$f(x, y) = \frac{1}{2\pi\sigma^2} e^{-\frac{x^2+y^2}{2\sigma^2}} \quad (1)$$

Figure 27:
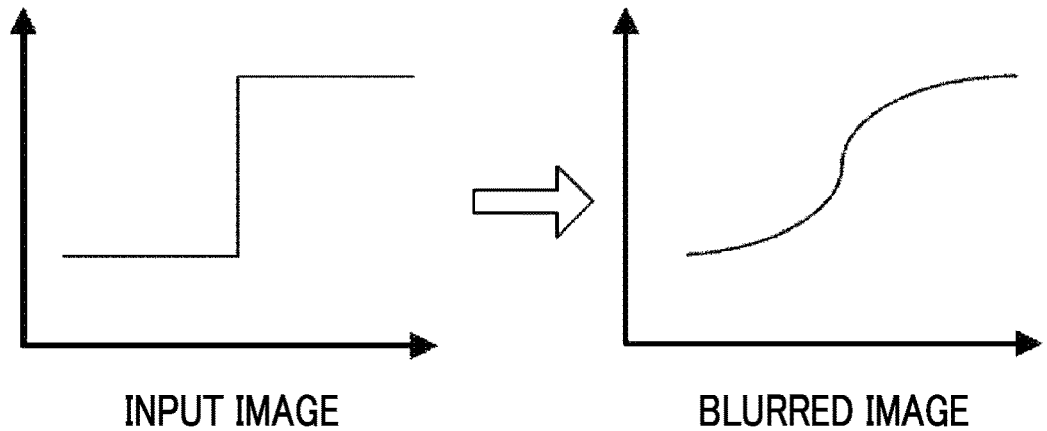
FIG. 27 is a descriptive diagram for describing one example of high-frequency component highlighting processing in image processing.

The standard deviation σ in Expression (1) above is a radius of the Gaussian distribution, that is, blurring of a blurred image, and is described as the number of pixels in the present embodiment. As illustrated in FIG. 27, the blurred image is generated from an input image by applying the unsharp mask illustrated by Expression (1) above to the input image.

Figure 28:
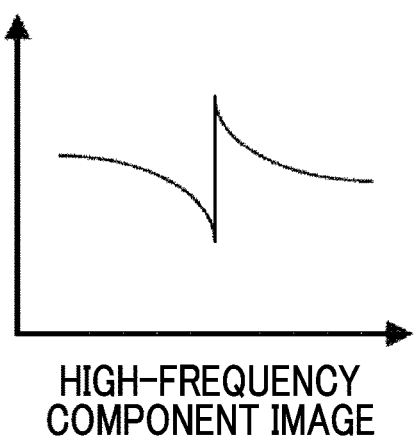
FIG. 28 is a descriptive diagram continued from FIG. 27, for describing one example of the high-frequency component highlighting processing in the image processing.

Furthermore, as illustrated in FIG. 28, the print image processing unit 86 generates a high-frequency component image from a difference between the input image and the blurred image. As illustrated in FIG. 28, in the high-frequency component image, the difference is particularly large in a region in which a difference in gradation is large.

Figure 29:
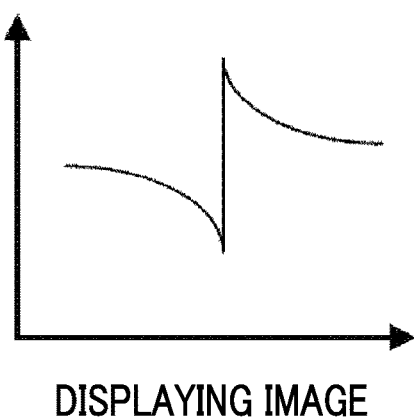
FIG. 29 is a descriptive diagram continued from FIG. 28, for describing one example of the high-frequency component highlighting processing in the image processing.

Furthermore, as illustrated in FIG. 29, the print image processing unit 86 generates a displaying image in which a high-frequency component is highlighted, by adding the high-frequency component image to the input image in accordance with a weight W. That is, the displaying image is in a state of degraded image quality, compared to the input image.

Figure 30:
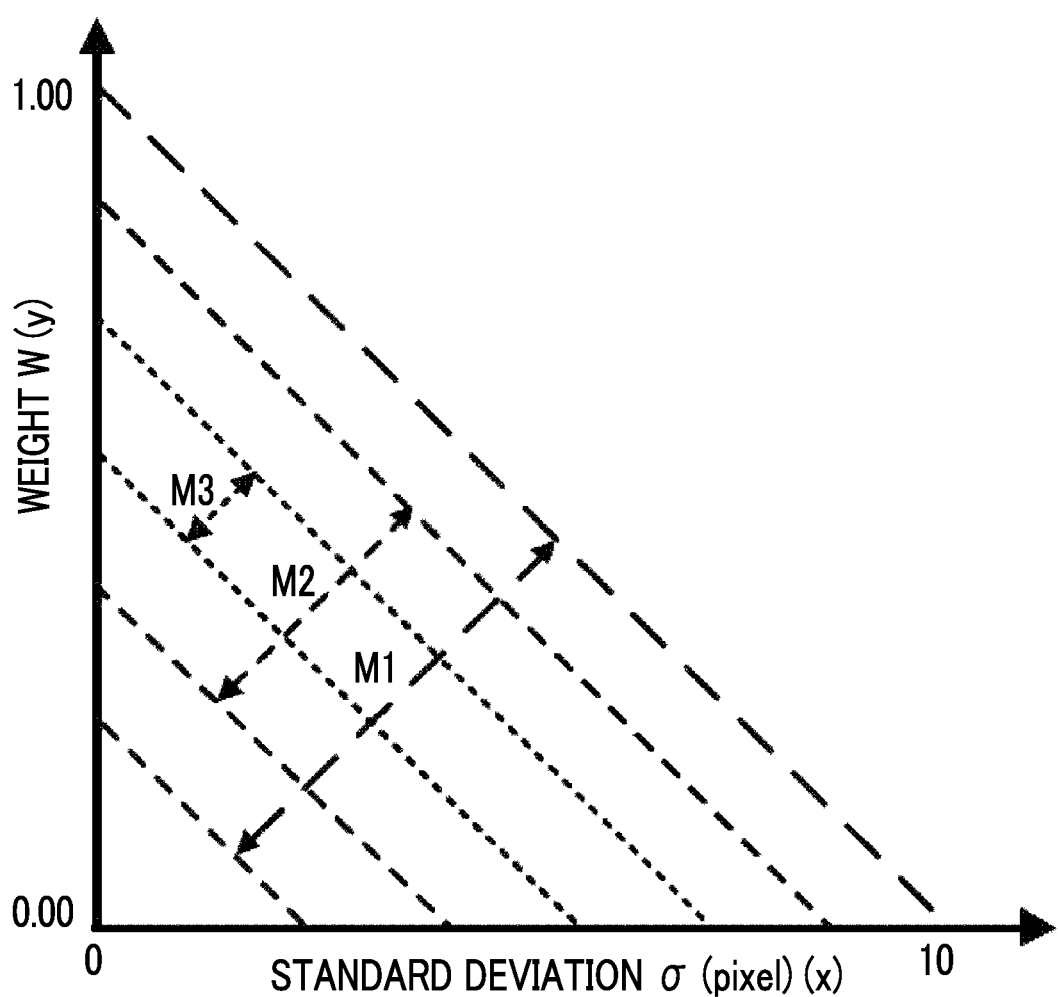
FIG. 30 is a graph for describing a preferable range of unsharp mask processing.

In a case where resolution of the exposure display 56 is 325 pixels per inch (ppi), in the unsharp mask processing to be applied to the input image, as will be described later as a "harmonic component highlighting experiment", a range of the unsharp mask to be applied is preferably a range M1 represented by Expression (2) below, more preferably a range M2 represented by Expression (3) below, and still more preferably a range M3 represented by Expression (4) below as illustrated in FIG. 30 in a case where the standard deviation σ is denoted by x and the weight W is denoted by y.

$$-0.1 \times x + 0.30 < y < -0.1 \times x + 1.00 \quad (2)$$

$$0.1 \times x + 0.40 < y < -0.1 \times x + 0.90 \quad (3)$$

$$0.1 \times x + 0.50 < y < -0.1 \times x + 0.80 \quad (4)$$

In a case where the resolution of the exposure display 56 is X ppi, an unsharp mask corresponding to a range obtained by multiplying the standard deviation σ in Expression (2) to Expression (4) by a number obtained by dividing X by 325 may be applied. Specifically, unsharp masks corresponding to the ranges M1 to M3 represented by Expression (5) to Expression (7), respectively, may be applied.

$$-0.1 \times x \times (X \div 325) + 0.30 < y < -0.1 \times x \times (X \div 325) + 1.00 \quad (5)$$

$$0.1 \times x \times (X \div 325) + 0.40 < y < -0.1 \times x \times (X \div 325) + 0.90 \quad (6)$$

$$0.1 \times x \times (X \div 325) + 0.50 < y < -0.1 \times x \times (X \div 325) + 0.80 \quad (7)$$

After harmonic component highlighting processing is performed by the print image processing unit 86, the displaying controller 90 exposes the instant film 110 by displaying, on the exposure display 56, the displaying image in which the harmonic component is highlighted, compared to the image displayed on the image displaying display 16.

EXPLANATION OF REFERENCES

1: printer-equipped camera
10: camera body
12: imaging lens
14: film lid cover
14a: hinge
16: image displaying display
16a: displaying surface
18: power button
20: film discharge port
42: image sensor
50: film loading chamber
52: film forwarding mechanism
52a: claw
54: film transport mechanism
54a: spreading roller pair
56: exposure display 56a: displaying surface
57: spring mechanism
58: exposure liquid crystal display
60: exposure backlight
60a: rod-shaped lamp
60b: light guide plate
62: louver member
62a: incidence surface
62b: exit surface
64: light blocking portion
64a: first light blocking portion
64b: second light blocking portion
65: light transmitting portion
66: protective film
68: image displaying liquid crystal display
70: image displaying backlight
70a: rod-shaped lamp
70b: light guide plate
72: touch sensor
74: light blocking wall
80: microcomputer
80a: displaying control unit
82: analog signal processing unit
84: digital signal processing unit
86: print image processing unit
88: memory
88a: memory controller
90: displaying controller
90a: image output interface
90b: switch
92: operation unit
100: instant film pack
110: instant film
110a: exposure surface
110b: observation surface
112: exposure region
114: pod portion
114a: developing treatment liquid pod
116: trap portion
116a: absorbent material
118: observation region
118a: frame
120: case
120a: exposure opening
120b: discharge port
120c: claw opening portion
140: stack
142: light blocking portion
144: light transmitting portion
150: first louver member
152: first light blocking portion
154: first light transmitting portion
170: second louver member
172: second light blocking portion
174: second light transmitting portion
CB: camera button
F: forwarding direction
H: horizontal axis
HCL: horizontal center line
LI: live view image
M: movement trajectory
MB: menu button
PB: playback button
PI: playback image
Pix: pixel
PrB: print button
S: distance
SB: shutter button
V: vertical axis
VCL: vertical center line
θ: angle

What is claimed is:

1. A printer-equipped camera comprising:
an instant film pack loading unit in which an instant film pack including an exposure opening is loaded;
a first display of which a displaying surface is arranged to face an exposure surface of an instant film in the instant film pack through the exposure opening with respect to the instant film pack loaded in the instant film pack loading unit, and that exposes the instant film by displaying an image;
a light exit direction restriction member that is included on the displaying surface of the first display and arranged at a position away from a film movement trajectory and restricts a light exit direction of light from each pixel of the first display to a constant range, wherein the light exit direction restriction member is a louver member or a porous plate;
a protective member that is comprised on an exit surface of the light exit direction restriction member;
a second display that displays an image to an outside;
a microcomputer configured to:
capture a subject image;
provide a print instruction for the image displayed on the second display;
perform edge highlighting processing on the image to be displayed on the first display, differently from the image displayed on the second display; and
expose the exposure surface of the instant film by displaying the image on the first display, with a size greater surface than at least an observation region of the instant film, in a case where the print instruction is provided,
wherein the first display and the second display are on a same side with respect to the instant film pack, and are arranged in a stack with a light blocking wall interposed therebetween,
the microcomputer is configured to perform the edge highlighting processing using unsharp mask processing as the edge highlighting processing, and
an unsharp mask represented by Expression (5) is applied:

$$-0.1 \times x \times (X \div 325) + 0.30 < y \times < 0.1 \times x \times (X \div 325) + 1.00 \qquad (5),$$

where a resolution is X pixels per inch, a standard deviation σ is denoted by x, and a weight is denoted by y.

2. The printer-equipped camera according to claim 1, wherein the microcomputer is configured to display, on the first display, an image subjected to the unsharp mask processing, which is weighted in accordance with resolution of the first display, compared to the image of the second display.

3. The printer-equipped camera according to claim 2, wherein the microcomputer is configured to:
switch between an imaging mode and a playback mode,
in a case where the imaging mode is set, display a captured image on the second display as an image of a print target, and
in a case where the playback mode is set, display an image stored in a storage on the second display as the image of the print target.

4. The printer-equipped camera according to claim 1, further comprising:

a film forwarding mechanism that forwards the instant film after exposure in a case where the print instruction is provided, wherein the film forwarding mechanism comprises a claw that moves forward and rearward in forwarding direction of the instant film; and a film transport mechanism that discharges the instant film forwarded by the film forwarding mechanism while developing the instant film, wherein the film transport mechanism comprises a roller pair.

5. The printer-equipped camera according to claim 1, wherein the microcomputer is configured to display, on the first display, an image obtained by inverting the image displayed on the second display.

6. The printer-equipped camera according to claim 1, wherein the microcomputer is configured to control displaying of the first display and the second display and switch OFF displaying of the second display while the instant film is exposed by displaying the image on the first display.

7. The printer-equipped camera according to claim 1, wherein the microcomputer is configured to:

control ON and OFF of the imaging, and switch OFF the imaging during displaying of the image on the first display.

8. The printer-equipped camera according to claim 7, wherein the microcomputer is configured to permit imaging even before the instant film pack is loaded in the instant film pack loading unit, or even in a case where an instant film before exposure is not present in the instant film pack.

9. The printer-equipped camera according to claim 1, wherein the microcomputer is configured to:

switch between an imaging mode and a playback mode, in a case where the imaging mode is set, display a captured image on the second display as an image of a print target, and in a case where the playback mode is set, display an image stored in a storage on the second display as the image of the print target.

10. The printer-equipped camera according to claim 1, wherein the microcomputer is configured to display information related to imaging on the second display.

11. The printer-equipped camera according to claim 1, wherein the microcomputer is configured to detect a touch operation performed on a displaying surface of the second display.

12. The printer-equipped camera according to claim 1, wherein the protective member causes the light exit direction restriction member and the surface of the instant film to be spaced by a constant distance.

13. The printer-equipped camera according to claim 12, wherein the constant distance is the same as a thickness of the protective member.

14. A displaying control method of a printer-equipped camera including a first display with a size greater surface than at least an observation region of an instant film that includes, on a displaying surface, a light exit direction restriction member including a louver member or a porous plate, which is arranged at a position away from a film movement trajectory, restricting a light exit direction of light from each pixel to a constant range and a protective member that is comprised on an exit surface of the light exit direction restriction member, and exposes a surface of an instant film by displaying an image, and a second display that displays an image to an outside, wherein the first display and the second display are on a same side with respect to an instant film pack, and are arranged in a stack with a light blocking wall interposed therebetween, the displaying control method comprising:

exposing the instant film by displaying the image on the first display by providing a print instruction for the image displayed on the second display, wherein, differently from the image displayed on the second display, the image displayed on the first display is subjected to edge highlighting processing, unsharp mask processing is used as the edge highlighting processing, and an unsharp mask represented by Expression (5) is applied:

$$-0.1 \times x \times (X \div 325) + 0.30 < y \times < 0.1 \times x \times (X \div 325) + 1.00 \quad (5),$$

where a resolution is X pixels per inch, a standard deviation σ is denoted by x, and a weight is denoted by y.

* * * * *